(12) United States Patent
Crabtree et al.

(10) Patent No.: US 12,537,848 B2
(45) Date of Patent: Jan. 27, 2026

(54) SYSTEM AND METHOD FOR ATTACKER INTERDICTION USING TRACK AND TRACE USER AND ENTITY BEHAVIOR ANALYSIS

(71) Applicant: QOMPLX LLC, Reston, VA (US)

(72) Inventors: Jason Crabtree, Vienna, VA (US); Richard Kelley, Woodbridge, VA (US)

(73) Assignee: QOMPLX LLC, Reston, VA (US)

( * ) Notice: Subject to any disclaimer, the term of this patent is extended or adjusted under 35 U.S.C. 154(b) by 167 days.

(21) Appl. No.: 18/361,799

(22) Filed: Jul. 28, 2023

(65) Prior Publication Data

US 2025/0039228 A1 Jan. 30, 2025

Related U.S. Application Data

(63) Continuation-in-part of application No. 18/359,883, filed on Jul. 27, 2023.

(51) Int. Cl.
*H04L 9/40* (2022.01)

(52) U.S. Cl.
CPC ...... *H04L 63/1441* (2013.01); *H04L 63/1425* (2013.01); *H04L 63/1433* (2013.01)

(58) Field of Classification Search
CPC ............. H04L 63/1441; H04L 63/1425; H04L 63/1433; H04L 63/1416; H04L 63/1458
See application file for complete search history.

(56) References Cited

U.S. PATENT DOCUMENTS

| | | |
|---|---|---|
| 2015/0295948 A1 | 10/2015 | Hassell et al. |
| 2016/0156656 A1 | 6/2016 | Boggs et al. |
| 2018/0097840 A1* | 4/2018 | Murthy .................. H04L 63/02 |
| 2020/0252411 A1 | 8/2020 | Inforzato et al. |
| 2021/0217007 A1 | 7/2021 | Menon |
| 2021/0226947 A1 | 7/2021 | Frankston et al. |
| 2021/0306352 A1* | 9/2021 | Narula .................... G06N 5/04 |
| 2021/0385214 A1 | 12/2021 | Jain et al. |

(Continued)

OTHER PUBLICATIONS

Wikipedia article for "Dijkstra's algortihm" dated Jun. 25, 2022 (14 pages) https://en.wikipedia.org/w/index.php?title=Dijkstra%27s_algorithm&oldid=1094953874 (Year: 2022).*

(Continued)

*Primary Examiner* — Thomas A Gyorfi
(74) *Attorney, Agent, or Firm* — Galvin Patent Law LLC; Brian R. Galvin

(57) ABSTRACT

A system and method for attacker interdiction using user-level network trace and tracking which leverages the uniqueness of verified authentication objects as metadata tags on captured network packets to gain insight at the user-level of how a network and various applications interact. The tagged network packets may be tracked, and the resulting data formed into a trace and track dataset to create one or more user-level dependency graphs alongside captured temporal dynamics. The trace and track dataset may be enriched with application trace information and runtime instruction data to improve the dependency graphs and provide deeper insight into application and user security on a given network. Attacks may be detected by analyzing the dependency graphs, and attacker interdiction may be implemented by actively orchestrating network security and IT devices using SOAR workflows.

20 Claims, 13 Drawing Sheets

(56) References Cited

U.S. PATENT DOCUMENTS

| | | |
|---|---|---|
| 2022/0060498 A1* | 2/2022 | Head, Jr. ............. H04L 12/4641 |
| 2022/0200971 A1 | 6/2022 | Vigneswaran |
| 2023/0068946 A1 | 3/2023 | McCarthy et al. |
| 2023/0132703 A1* | 5/2023 | Marsenic ............ H04L 63/1433 |
| | | 726/25 |
| 2023/0195901 A1 | 6/2023 | Allen |

OTHER PUBLICATIONS

De Pina, Roel, International Search Report, Nov. 19, 2024, p. 2-3.

* cited by examiner

SOAR Workflow for Updating Rules & Signatures for IDS/IPS
in Response to Kerberos Authentication Issue Detection

SYSTEM AND METHOD FOR ATTACKER INTERDICTION USING TRACK AND TRACE USER AND ENTITY BEHAVIOR ANALYSIS

CROSS-REFERENCE TO RELATED APPLICATIONS

Priority is claimed in the application data sheet to the following patents or patent applications, each of which is expressly incorporated herein by reference in its entirety:
Ser. No. 18/359,883

BACKGROUND OF THE INVENTION

Field of the Art

The disclosure relates to the field of cybersecurity and threat analytics, and more particularly to attacker detection, interdiction or response using user entity and behavior analytics (UEBA).

Discussion of the State of the Art

NTLM, Kerberos and SAML (including OAuth and OIDC authentication extensions) are authentication protocols that allow users to securely authenticate to a network or application. If these protocols are compromised, manipulated, or otherwise abused, an attacker could impersonate a legitimate user, gain access to sensitive data, or execute malicious actions undetected. User and entity behavior analytics (UEBA) systems rely on accuracy and reliability of authentication logs and events to attribute behaviors to entities and ultimately baseline and detect abnormal behavior and suspicious activity using statistics, heuristics, deterministic rules, or machine learning. If the authentication logs are inaccurate or manipulated (either because of insecure protocol usage, trust abuse, poor encryption type usage, or other misconfiguration or manipulation), the UEBA system may not function properly, notably generating false positives or missing actual threats, leading to ineffective or inadequate detection and response.

Therefore, verifying the integrity and validity of Kerberos and SAML (again including Oauth2 and OIDC variants) authentication objects is crucial to ensure that the data used by the UEBA system is reliable and accurate, and that the resulting analytics and insights are trustworthy and effective and detecting and responding to cybersecurity threats.

What is needed is a system and method for attacker detection and interdiction using user-level network track and tracing which leverages the uniqueness of authentication object data to create bijective associations between user session and network flow traces.

SUMMARY OF THE INVENTION

Accordingly, the inventor has conceived and reduced to practice, a system and method for attacker interdiction using user-level network trace and tracking which leverages the uniqueness of verified authentication objects as metadata tags on captured network packets to gain insight at the user-level of how a network and various applications interact. The tagged network packets may be tracked, and the resulting data formed into a trace and track dataset to create one or more user-level dependency graphs alongside captured temporal dynamics. The trace and track dataset may be enriched with application trace information and runtime instruction data to improve the dependency graphs and provide deeper insight into application and user security on a given network. This may occur within temporal graphs at the physical, logical, application, business process or financial process level. Attacks may be detected by analyzing the dependency graphs, and attacker interdiction may be implemented by actively orchestrating network security and IT devices using SOAR and more intelligent (e.g. ML-powered or HTN-powered or POMDP powered) automated planning and response workflows.

According to a preferred embodiment, a system for cybersecurity attacker interdiction using user-level network tracking and tracing is disclosed, comprising: a computing device comprising a memory, a processor, and a non-volatile data storage device; a user-level dependency graph stored on the non-volatile data storage device, the user-level dependency graph comprising a model of a computer network identifying dependencies of users and devices in the computer network on other users and devices in the computer network; and a modeling and simulation engine comprising a first plurality of programming instructions stored in the memory which, when operating on the processor, causes the computing device to: create a model of vulnerabilities, including lateral movement and privilege escalation paths, of the computer network to cyberattacks by running one or more graph traversal algorithms on the user-level dependency graph to identify paths to critical systems within the user-level dependency graph; run a simulated cyberattack on the model of vulnerabilities of the computer network, the cyberattack comprising a cyberattack type; identify a user or device of the computer network that has been compromised by the cyberattack; and send the cyberattack type and identified user or device to an attacker intercept manager; the attacker intercept manager comprising a second plurality of programming instructions stored in the memory which, when operating on the processor, causes the computing device to: receive the cyberattack type and identified user or device; leverage a simulation or automated planning engine or AI planner to determine from the prospective cyberattack type at least one appropriate security orchestration, automation, and response (SOAR) workflow to implement to mitigate the cyberattack; optionally gain user input/confirmation or implement a recommended or determined SOAR workflow from the planning choices; and apply a restriction or configuration change to the identified user, device, source, destination or pattern of identified traffic to prevent further compromises of that user or device by the cyberattack or abuse.

According to another preferred embodiment, a method for cybersecurity attacker interdiction using user-level network tracking and tracing is disclosed, comprising the steps of: storing a user-level dependency graph on a non-volatile data storage device of a computing device comprising a memory, a processor, and the non-volatile data storage device, the user-level dependency graph comprising a model of a computer network identifying dependencies of users and devices in the computer network on other users and devices in the computer network; and using a modeling and simulation engine operating on the computing device to: create a model of vulnerabilities of the computer network to cyberattacks by running one or more graph traversal algorithms on the user-level dependency graph to identify paths to critical systems within the user-level dependency graph; run a simulated cyberattack on the model of vulnerabilities of the computer network, the cyberattack comprising a cyberattack type; identify a user or device of the computer network that has been compromised by the cyberattack; and send the cyberattack type and identified user or device to an attacker intercept manager operating on the computing device; using the attacker intercept manager comprising a second plurality of programming instructions stored in the memory which, when operating on the processor, causes the computing device to: receive the cyberattack type and identified user or device; determine from the cyberattack type an appropriate security orchestration, automation, and response (SOAR) workflow to implement to mitigate the cyberattack; implement the determined SOAR workflow; and apply a restriction to the identified user, device, source, destination, or pattern of identified traffic to prevent further compromises of that user or device by the cyberattack.

According to an aspect of an embodiment, the cyberattack type is a denial of service (DOS) or distributed denial of service (DDoS) type of cyberattack and the rule or BYOML model or AI planner enhanced SOAR workflow comprises DNS sinkholing or microsegmentation configuration adjustment (e.g. Illumio) or hypervisor configuration changes (including cloud services like Azure or AWS).

According to an aspect of an embodiment, the cyberattack type is a cyberattack type from the list of Kerberos spoofing, manipulation, forgery or replay attacks, password attacks, Kerberos ticket granting service attacks, and denial of service (DOS) or distributed denial of service (DDOS) attacks, and the AI or automated planning enhanced SOAR workflow comprises updating of intrusion detection system (IDS) signatures, intrusion prevention system (IPS), routing tables, Virtual Local Area Network (VLAN) configurations, Access Control Lists (ACL) signatures, or any combination.

According to an aspect of an embodiment, the cyberattack type is a cyberattack type from the list of network eavesdropping (i.e. man in the middle), theft of user authentication tokens (e.g. bearer token) or credentials, ticket or token forgery, authentication message deletion, authentication message modification, and the AI or automated planner enhanced SOAR workflow comprises DNS sinkholing, microsegmentation configuration adjustment (e.g. Illumio) or hypervisor configuration changes (including cloud services like Azure or AWS), endpoint configuration changes (e.g. modifying allow/block lists via Tanium or CarbonBlack or changing targeted data collection via changes to WEL or Sysmon audit configs), changes to directory services or IAM policies (e.g. modification to ZTNA policy engine, MFA requirements for given transaction, user reauthentication, enforcement of user restrictions, session hijacking, parallel sessions, inactive account probing, or simply alerting for follow-on insight or alert or incident investigation by human or machine driven analytics processes.

According to an aspect of an embodiment, the cyberattack type is malware or malicious actor detected within the computer network, and the SOAR workflow comprises blocking network traffic via DNS sinkholing, endpoint blocking or quarantine, network IDS/IPS blocks, microsegmentation based blocking, or revocation of authentication credentials or authorization for given credentials to specific business applications or network resources.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION OF THE INVENTION

Figure 1:
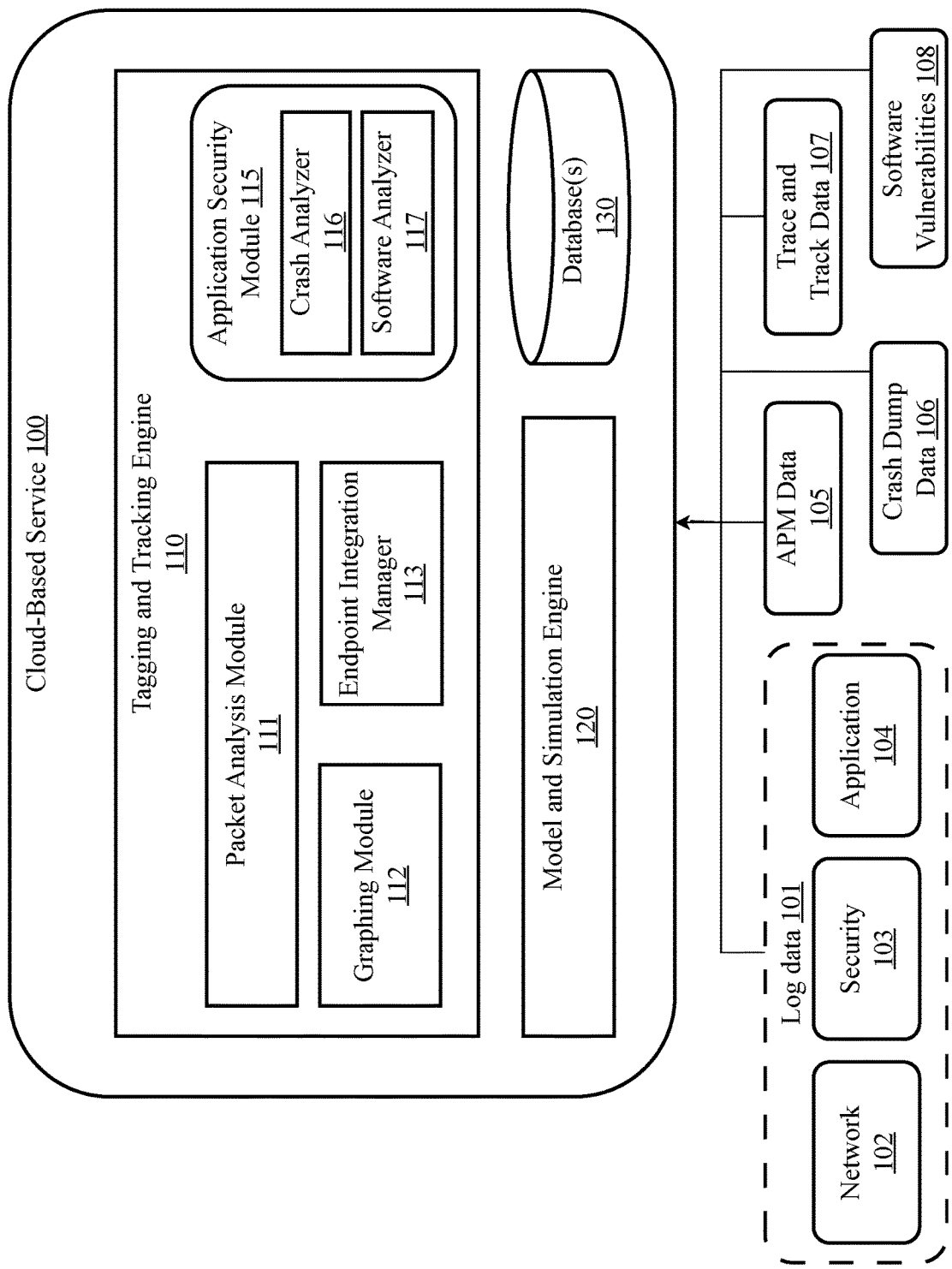
FIG. 1 is a block diagram illustrating an exemplary system architecture of a cloud-based service for providing user and entity behavior analysis utilizing network layer track and trace, according to an embodiment.

The inventor has conceived, and reduced to practice, a system and method for attacker interdiction using user-level network trace and tracking which leverages the uniqueness of verified authentication objects as metadata tags on captured network packets to gain insight at the user-level of how a network and various applications interact. The tagged network packets may be tracked, and the resulting data formed into a trace and track dataset to create one or more user-level dependency graphs alongside captured temporal dynamics. The trace and track dataset may be enriched with application trace information and runtime instruction data to improve the dependency graphs and provide deeper insight into application and user security on a given network. Attacks may be detected by analyzing the dependency graphs, and attacker interdiction may be implemented by actively orchestrating network security and IT devices using SOAR workflows.

Tracking and tracing data, users, services, or attackers through a network is an essential aspect of cybersecurity. It involves monitoring and analyzing network traffic, logs, and various data sources to identify and investigate potential security incidents. There are several techniques and technologies used for tracking and tracing in cybersecurity, and distributed tracing of complex systems can play a significant role in the process. Network monitoring tools are used to capture and analyze network traffic. These tools can track the flow of data packets and identify the source and destination of network connections. By analyzing network logs and traffic patterns the system can trace the path of data and identify any anomalies or suspicious activities. In addition, logging and auditing mechanisms record various activities and events within a network or system. By reviewing logs, the system can track user actions, service activities, and system events to identify any unauthorize or malicious activities. This can help in tracing the source of an attack or identifying the user or service responsible for a particular action. Additionally, although NTLM is not securable per se as a protocol, additional usage of NTLM, encryption and trust characteristics associated with network, protocol and endpoint data (e.g. logs) can help facilitate additional data elements for baselining and behavioral analysis both independently from and in concert with the Kerberos and SAML specific insights for whole user and entity utilization information.

The system can monitor network traffic and system activities in real-time to detect and prevent malicious activities. The system analyzes network packets and system logs, utilizing an array of techniques (e.g., signature-based, behavioral-based, etc.) to identify known attack patterns or anomalous behaviors. Endpoint detection and response (EDR) system data which focuses on monitoring and securing individual endpoints, such as desktops, laptops, or servers, may be collected and analyzed, including system logs, process information, software (e.g., execution trees), and network connections, to detect and respond to security incidents. By tracing the activities and connections of compromised endpoints, EDR data can help identify the attackers and track their movements within a network.

Distributed tracing of complex system plays a crucial role in tracking and tracing activities across multiple components and services within a network. In modern distributed systems, applications are often composed of numerous microservices or components that communicate with each other. Distributed tracing enables the monitoring and analysis of the flow of requests and responses across these distributed components. By instrumenting code and adding tracing metadata to requests, the system can track the path and timing of requests as they traverse various components. This allows for end-to-end visibility into the behavior of complex systems, helping in identifying performance bottlenecks, troubleshooting issues, and detecting security incidents. In the context of cybersecurity, distributed tracing can be leveraged to trace the flow of data and identify potential security vulnerabilities or breaches. It can assist in understanding the sequence of events leading to a security incident, identifying the entry points and compromised components, and tracking the activities of attackers within the distributed system (e.g., a network).

In some implementations, the system and methods provided may be used to provide end-to-end distributed tracing of a complex system (e.g., a distributed (or not) network) wherein various types of transactions are monitored to understand the flow of requests and responses across the system. Some exemplary types of transactions can include, but are not limited, user transactions, service-to-service transactions, external service transactions, and internal service transaction, to name a few.

User transactions can include (but is not limited to): a user registration by tracking the transaction flow when a user registers for an account or signs up for a service, a user login by monitoring the transaction flow when a user logs into the system, including authentication and authorization processes, and a user profile update by tracing the transaction flow when a user updates their profile information, such as changing their password or updating personal details.

Service-to-service transactions can include (but is not limited to): an application programming interface (API) request/response by tracking the transaction flow when one service makes an API request to another service and receives a response, a database query by monitoring transaction flow when a service interacts with database by issuing queries and receiving query results, and message queue processing by tracing the transaction flow when services communicate through a message queue or event bus, passing messages and processing them.

External service transactions can include (but is not limited to): payment processing by tracking the transaction flow when a system integrates with a payment gateway or processor to handle payment transaction; a third-party API integration by monitoring the transaction flow when a system interacts with external APIs for services like geolocation, weather data, or social media integration; and email delivery by tracing the transaction flow when a system sends emails using external email delivery services, tracking the request and response for email delivery.

Internal system transactions can include (but is not limited to): system caching by monitoring the transaction flow when a system utilizes a caching mechanism to store and retrieve data, tracking cache hits and misses; file storage/retrieval by tracing transaction flow when a system interacts with a file storage system to upload, download or manipulate files; and background jobs/processing by tracking the transaction flow when a system performs background tasks or asynchronous processing, such as generating reports or performing periodic updates.

These examples illustrate the diverse range of transactions that can be monitored during end-to-end distributed tracing. By capturing and analyzing the transaction flow across the complex system, organizations can gain insights into the performance, reliability, and security aspects of their distributed applications and network, enabling effective troubleshooting, optimization, and identification of potential issues or bottlenecks.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, a "network flow" or "netflow" refers to a sequence of related network packets that share common characteristics or attributes. It represents the movement of data packets from a source destination across a network. A network flow is typically defined by a set of key fields that describe the characteristics of the packets, such as source IP address, destination IP address, source port, destination port, protocol type, and other relevant metadata.

Detailed Descriptions of the Drawing Figures

FIG. 1 is a block diagram illustrating an exemplary system architecture of a cloud-based service for providing user and entity behavior analysis utilizing network layer track and trace, according to an embodiment. The system may be configured to receive, retrieve, or otherwise obtain a plurality of network, compute, process, user, and software information, to selectively evaluate the likely utilization of data and to sample from various locations and sources for natural language processing and other techniques (including vectorization and vector databases) that can support identification of data of interest or relating to a specific risk, compliance, reporting, or handling processes (e.g., personal identifying information, HIPPA, PCI, etc.). The system may obtain a plurality of data associated with a network such as, for example application performance monitoring (APM) data 105, various log information 101 (e.g., network log 102, security log 103, application log 104, etc.), software vulnerability data 108, crash dump data 106, and trace and track data 107 at the application level, combined with session level authentication information and network level traces through physical and logical segments of a complex system (e.g., computing system) to create a dataset from which to construct a user-level dependency map and behavioral analysis.

This exemplary architecture allows for attacker interdiction using user-level network trace and tracking which leverages the uniqueness of verified authentication objects as metadata tags on captured network packets to gain insight at the user-level of how a network and various applications interact. The tagged network packets may be tracked, and the resulting data formed into a trace and track dataset to create one or more user-level dependency graphs alongside captured temporal dynamics. The trace and track dataset may be enriched with application trace information and runtime instruction data to improve the dependency graphs and provide deeper insight into application and user security on a given network. This may occur within temporal graphs at the physical, logical, application, business process or financial process level. Attacks may be detected by analyzing the dependency graphs, and attacker interdiction may be implemented by actively orchestrating network security and IT devices using SOAR and more intelligent (e.g. ML-powered or HTN-powered or POMDP powered) automated planning and response workflows.

According to an embodiment, a tagging and tracking engine 110 is present and configured to analyze various obtained network packets (e.g., streams of network flow data) and perform metadata tagging one the network packets based on the results of the analysis. Further, tagging and tracking engine 110 can be configured to obtain and analyze application performance information (e.g., APM data 105) from various sources such as, for example, third-party software monitoring/tracing tools, crash dump data 106, software vulnerability data 108, and/or the like. The results of the analysis of such data may be used to enrich a dataset of track and trace data which can be used to create one or more graph representations of a network and its users and processes. In some implementations, the graph representation may be a user-level dependency graph. In an aspect of an embodiment, the user-level dependency graph is created based on at least a subset of a track and trace dataset comprising one or more of application trace data, tagged packet tracking data, APM data, crash dump data, software vulnerability data, authentication object data, and network log data (e.g., security and application log data).

A user-level dependency graph (or map) is a visual representation of the dependencies between different software components or modules at the user of application level. It provides a high-level view of how different components within a network interact and rely on each other to fulfill user or application requirements. The user-level dependency graph focuses on the relationships between and among components from the perspective of user interactions or application flows. It helps in understanding the dependencies between different features, functions, or modules of an application and how they contribute to the overall functionality. The graph visually represents the dependencies between different components, allowing stakeholders (e.g., enterprise security analysts) to understand the flow of data, control, or functionality with an application. By analyzing user-level dependency graphs, it becomes easier to identify critical paths or dependencies that are crucial for the functioning of an application (and it some cases, therefore, the entire network). This can lead to prioritizing efforts, optimizing performance, and ensuring the reliability of the network.

According to an embodiment, a packet analysis module 111 is configured to receive, retrieve, or otherwise obtain a plurality of network packets from a plurality of network sources, analyze the network packets to determine a protocol associated with the packets, and apply a metadata tag to a network packet, wherein the metadata tag allows tagging and tracking engine 110 track/trace the network packet as it moves through the network from source to destination. The result is a track/trace dataset associated with tagged network packet which can be used for various purposes including, but not limited to, analysis to determine a network flow associated with the network packet, as an input for a graphical representation of the network, analysis for malicious behavior or activity, and for cyber risk scoring.

Packet analysis module 111 may analyze a received packet to determine a protocol associated with the packet. In some embodiments, packet analysis module 111 captures the packet and inspects the packet's header to identify the ethernet header to extract the ethernet type value. The network layer protocol (e.g., IPv4, IPV6, ARP, etc.) may be determined based on the extracted ethernet type value. If the packet is an IP packet, the IP header is then examined to identify the transport layer protocol (e.g., TCP, UDP, ICMP, etc.) used in the packet. Once the proper protocol has been determined, the packet may be tagged with metadata that allows tagging and tracking engine 110 to track the packet as it traverses the network to its destination. The system determines the protocol first so that it can apply the metadata tag to the appropriate field used in the packet, which varies from protocol to protocol. In some embodiments, the metadata may be associated with a specific user or group of users by using a unique value or object which represents the user or group. For example, the device used by a user to access a network has a unique identification number which can be obtained and used to track that specific user as they interact with the network. In some embodiments, a verified authentication object associated with a user may be used as an identifier and implemented as a metadata tag on a network packet. An authentication object database 130 may be present and configured to store a plurality of all authentication objects as they are created by the appropriate entity (e.g., ticket granting service) thereby providing a verified record of all active authentication object currently in use within a network. The uniqueness of the stored authentication objects makes them good candidates to be implemented as metadata tags on network packets which allows for user-linked network tracing as the packet traverses the network. This provides a novel enhancement to user-level tracking through a network because of both the uniqueness and verified nature of the stored authentication objects.

Packet analysis module 111 may tag a network packet or process with metadata associated with a particular user in order to track the user's behavior and path as the user engages with and traverses a network. To tag a packet to trace it through network infrastructure, various methods may be used including, but not limited to, network taps, port mirroring, and network detection analytics (NDA). Network taps are hardware devices that provide access to network traffic in a non-intrusive manner. Network taps can be installed at strategic points in a network infrastructure, such as between switches or routers. Taps mirror the traffic passing through them and send it to a network analyzer, which can then capture and analyze the packets. Port mirroring is a software-based technique that copies the traffic from one or more ports on a switch or router to another port. This can be useful for monitoring network traffic without disrupting network operations. NDA is a method of analyzing network traffic to identify potential security threats. NDA can be used to tag packets by assigning metadata to them based on the type of traffic, source, destination, and other factors. This metadata can use used to trace packets through the network and identify the source of a security incident.

Tagging and adding metadata to a network packet or software process involves attaching additional information or context to the network packets or processes as they traverse a network. In some embodiments, header extensions, which are supported by various network protocols, may be used for the inclusion of metadata. For example, in Internet Protocol (IP), options fields can be used to add custom metadata. Similarly, in transmission control protocol (TCP) and user datagram protocol (UDP), option or payload fields can be utilized for added metadata for tagging and tracking purposes. Some protocols have specific fields dedicated to carrying metadata. For instance, in the Domain Name System (DNS), the "Additional Information" section can be used to include additional data related to DNS queries or responses. Virtual LAN (VLAN) tagging is a method used to add metadata to Ethernet frames. It involves adding an additional tag to the Ethernet frame header, which carries information about the VLAN ID, or other metadata related to the virtual LAN. In some implementations, deep packet inspection techniques may be implemented by tagging and tracking engine 110 to inspect the content of network packets, including the payload, to extract metadata and/or add metadata. In other embodiments, instead of attaching metadata to individual packets, flow-based metadata can be added at the flow level. Flow-based metadata provides information about the aggregate behavior of a sequence of packets sharing common characteristics, such as source and destination IP addresses, ports, and protocol.

There are various metadata fields that can be used to tag a packet for tracing, such as the source and destination IP addresses, port numbers, protocol type, and timestamp. This metadata can be used to track the packet as it moves through the network infrastructure, allowing the system to identify the path it took and any potential issues that may have occurred along the way. This process is applicable to various network flow protocols such as, for example, NetFlow, sFlow, or IPFIX. In various implementations, system 100 leverages authentication object aggregation and verification capabilities and the inherent uniqueness of the authentication object data (e.g., ticket, hash, token, etc.) to tic a network flow to an identity using deep packet analysis network infrastructure. This may yield an enriched dataset referred to herein as sessionized authentication enriched netflow (SAEN). This represents an improvement upon the current state of the art as the system is configured to provide enrichment with authentication flows from key distribution centers, SAML IdPs/SPs, SPNs, various endpoints (e.g., EDR systems, WEL/Sysmon or Linux equivalent, etc.), and multifactor authentication services and identify access management gateways/identify provider proxies to create bijective associations between user sessions and network flow traces. In some implementations, all of, or a subset of, SAEN data may be incorporated into the enriched trace and track dataset and then used to create one or more user-level dependency graphs.

According to an embodiment, tagging and tracking engine 111 may combine the authentication sessions with packet tags by embedding additional metadata into packets associated with sessions between users and applications that relate to targeted tickets or tokens of interest. The system may leverage its authentication object aggregation and verification capabilities to produce an authentication object database 130 comprising at least a plurality of verified authentication objects. Each of the authentication objects may be associated with a particular user. The uniqueness of each of the authentication objects (e.g., authentication data) can be used to logically link a flow to a user identity. This allows the system to "track and trace" behaviors through both time and topology. This may be extended into application space via tracing and APM extensions to network, log, and host telemetry to offer the ability to construct exceedingly accurate details of interactions on the network. Track and trace data may be stored in database 130. In some implementations, database 130 is a vector database and obtained data is vectorized prior to being stored in the vector database.

According to an embodiment, an endpoint interaction manager 113 may be present and configured to dynamically interact directly with various endpoint tools (e.g., Tanium) or to other tools (e.g., system center configuration manager/systems center operations manager, Windows management instrumentation query language, etc.) to change system or device configurations, attributes, and/or operating states. For example, system can change the registry settings for the location to where crash dumps should be sent (e.g., to a midserver) and to potentially change the "depth" or decision to pass along a dump at all (i.e., local filter) such that prior to sending large amounts of data to a midserver (or some other location), they can be evaluated based on some (or none) local criteria that might indicate potential information gained from a defender's perspective. Crash dump data 106 may be obtained by tagging and tracking engine 110 and analyzed by an application security module 115.

Present in this embodiment is an application security module 115 comprising a crash analyzer 116 and a software analyzer 117. Crash analyzer 116 may be configured to detect security threats in applications by using static and dynamic analysis of application crash dumps. Performing automated static and dynamic analysis of application crash dumps involves analyzing the information captured during a crash or failure of an application. Crash dumps, also known as core dumps or minidumps, are diagnostic files generated by operating systems or applications when they encounter an unexpected error or crash. By performing automated static and dynamic analysis of application crash dumps, tagging and tracking engine 110 can gain insights into the root cause of the crash, identify bugs, memory issues, or security vulnerabilities, and take appropriate measures to address them. In some embodiments, the results of the analysis such as potential security vulnerabilities may be added to the enriched trace and track dataset and used in part to create one or more graphical representations of the network.

Static analysis involves examining the crash dump file without executing the code. It focuses on the metadata and data structures within the dump file. Some key activities involved in static analysis of crash dumps are: parsing and extraction wherein the crash dump file is parsed to extract relevant information such as memory addresses, register states, stack traces, and exception details; symbol resolution wherein symbolic information, such as function names and variable names, is resolved by matching memory addresses to their corresponding code symbols which helps in identifying specific functions or modules responsible for the crash; code analysis wherein the code sections within the crash dump can be analyzed to identify potential coding errors, memory corruption, or security vulnerabilities, and may involve examining the assembly instructions, examining memory regions, or analyzing specific data structures; and memory analysis wherein memory regions and object states captured in the crash dump can be analyzed to identify memory leaks, access violations, or uninitialized memory issues.

Dynamic analysis involves executing the crash dump in a controlled environment to observe the behavior and identify the cause of the crash. Some activities involved in dynamic analysis of crash dumps are: crash reproduction wherein the crash dump is loaded into a debugging environment or specialized tools that can reproduce the crash which allows for controlled execution and analysis of the faulty code path; step-by-step execution wherein the code within the crash dump is executed step-by-step, allowing analysts to observe the program state at each step and identify the exact point of failure; memory inspection wherein dynamic analysis tools can inspect memory contents during execution to identify memory corruption, buffer overflows, or invalid memory access; and resource monitoring wherein various system resources such as CPU usage, memory usage, and file system access can be monitored during the dynamic analysis to identify any abnormal behavior or resource-related issues.

Software analyzer 117 may be configured to perform data-flow and control analysis of software programs. In some embodiments, software analyzer 117 may insert tracking code into a software program to detect and report on a variety of memory safety issues, such as buffer overflows, use-after-free errors, and other memory corruption vulnerabilities that could be exploited by attackers. Software analyzer 117 is configured to work with a wide range of programming languages including C, C++, Rust, and WebAssembly. It also can support multiple operating systems, including Linux, macOS, and Windows. In various implementations, software analyzer 117 may provide low-level virtual machine (LLVM) execution analysis that instruments programs to track which bytes of an input file are operated on by which functions. In some embodiments, it inserts specialized instructions and data structures (e.g., code snippets, hooks, etc.) into the program's code to track memory allocations, deallocations, and accesses. It may output a database comprising the data-flow information (e.g., data sources, data paths, data transformations, data sinks, data dependencies, etc.), as well as a runtime trace. A runtime trace may comprise information such as, for example, a record of events or actions that occur during execution of program or software system. It captures information about the sequence of operations, function calls, variable values, and other relevant data as the program runs. In some embodiments, this output database may be added in part, or in whole, to the enriched trace and track dataset and used to create one or more user-level dependency graphs.

According to the embodiment, a graphing module 112 is present and configured to create various graphical representations of a network under analysis. In some embodiments, graphing module 112 may create one or more composite graphs that graphically represent the relationships between files, domains, IP addresses, execution instructions, and other entities related to a given malware analysis. The graph may be enriched with crash dump data obtained from application security module 115 and user behavior and analytics based on track and trace data. The enriched graph can enable the consideration of relationships and processes such as direct network connections which can address capabilities such as, for example, developers ssh'ing into production infrastructure and bypassing change control processes.

In other embodiments, graphing module 112 is configured to create one or more user-level dependency graphs using various types of data from a plurality of sources. Examples of data which may be used as part of the dataset to create a user-level dependency graph can include, but are not limited to, various log data, APM data, trace and track data, software vulnerability information, crash dump data, data-flow information, runtime trace data, application trace data, and authentication object data, and/or the like.

According to the embodiment, a model and simulation engine 120 is present and configured to provide model creation and management as well as simulation capabilities using various datasets such as, for example, the enriched trace and track dataset. In some implementations, crash dump data alongside all other data sources described herein may be used for the emulation of both successfully executed software and crashed software to build large-scale threat models of potentially executable attack paths. This can be leveraged to provide automated generation of ongoing potential security threats as processes occur throughout a network.

In some embodiments, the cyberattack type may be a denial of service (DOS) or distributed denial of service (DDoS) type of cyberattack and the rule or BYOML model or AI planner enhanced SOAR workflow comprises DNS sinkholing or microsegmentation configuration adjustment (e.g. Illumio) or hypervisor configuration changes (including cloud services like Azure or AWS).

In some embodiments, the cyberattack type may be a cyberattack type from the list of Kerberos spoofing, manipulation, forgery or replay attacks, password attacks, Kerberos ticket granting service attacks, and denial of service (DOS) or distributed denial of service (DDOS) attacks, and the AI or automated planning enhanced SOAR workflow comprises updating of intrusion detection system (IDS) signatures, intrusion prevention system (IPS), routing tables, Virtual Local Area Network (VLAN) configurations, Access Control Lists (ACL) signatures, or any combination.

In some embodiments, the cyberattack type may be a cyberattack type from the list of network eavesdropping (i.e. man in the middle), theft of user authentication tokens (e.g. bearer token) or credentials, ticket or token forgery, authentication message deletion, authentication message modification, and the AI or automated planner enhanced SOAR workflow comprises DNS sinkholing, microsegmentation configuration adjustment (e.g. Illumio) or hypervisor configuration changes (including cloud services like Azure or AWS), or endpoint configuration changes (e.g. modifying allow/block lists via Tanium or CarbonBlack or changing targeted data collection via changes to WEL or Sysmon audit configs), or changes to directory services or IAM policies (e.g. modification to ZTNA policy engine, MFA requirements for given transaction, user reauthentication, enforcement of user restrictions, or simply alerting for follow-on insight or alert or incident investigation by human or machine driven analytics processes.

In some embodiments, the cyberattack type may be malware or malicious actor detected within the computer network, and the SOAR workflow comprises blocking network traffic via DNS sinkholing, endpoint blocking or quarantine, network IDS/IPS blocks, microsegmentation based blocking, or revocation of authentication credentials or authorization for given credentials to specific business applications or network resources.

Figure 2:
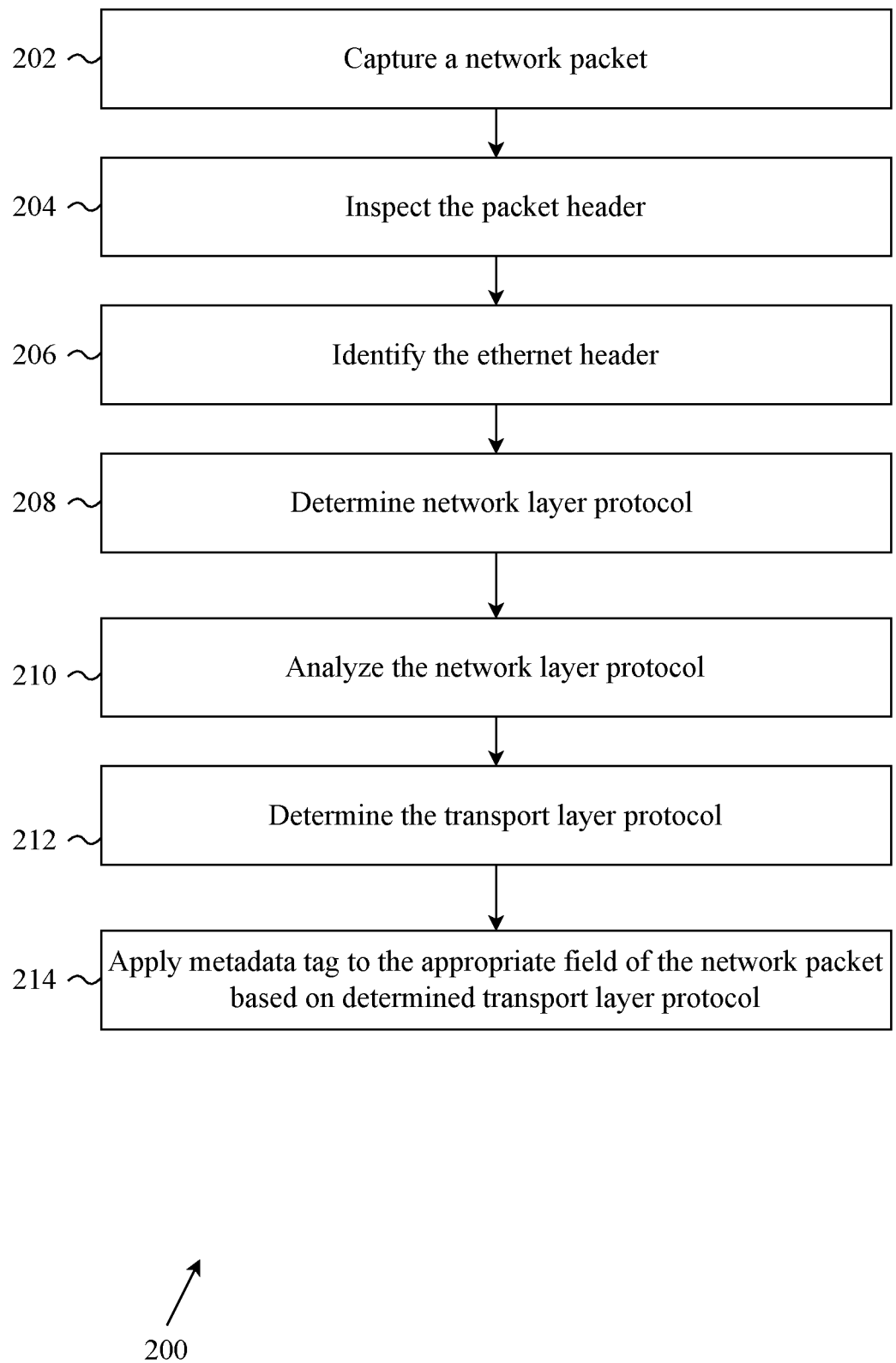
FIG. 2 is a flow diagram illustrating an exemplary method for capturing, analyzing, and tagging network packets, according to an aspect of an embodiment.

FIG. 2 is a flow diagram illustrating an exemplary method 200 for capturing, analyzing, and tagging network packets, according to an aspect of an embodiment. The process may be implemented as machine readable instructions and executed by a computing device comprising at least a processor and a memory. According to the embodiment, the process begins at step 202 when packet analysis module 111 captures (e.g., receives, retrieves, or otherwise obtains) a network packet. At step 204 the module may inspect the packet details to identify the header. At step 206 the packet header is inspected to identify the ethernet header and then extract the ethernet type value from the header. At step 208, packet analysis module 211 can determine the network layer protocol based on the extracted ethernet type value. Some common network layer protocol values include IPv4, IPV6, and address resolution protocol (ARP). At step 210, the network layer protocol is analyzed to determine at step 212 the transport layer protocol (e.g., TCP, UDP, ICMP, etc.) and thus the protocol associated with the captured network packet. As a last step 214 packet analysis module 111 applies a metadata tag to the appropriate field of the network packet based on the determined transport layer protocol. In some implementations, the metadata tag may be associated with an authentication object associated with a network user. In some implementations, the tagged network packet may be tracked as it traverses the network to form a trace and track dataset which can be used in part, or in its entirety, to create one or more graphical representations of a given network, application, process, or some combination thereof.

Figure 3:
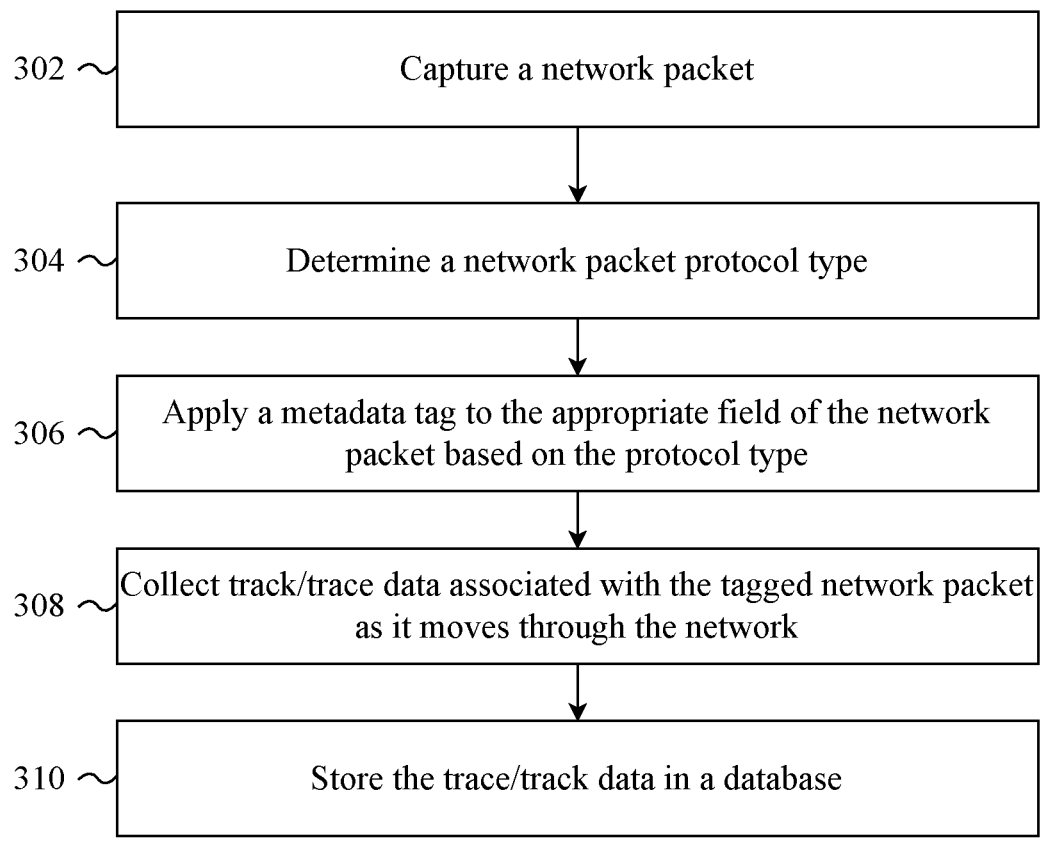
FIG. 3 is a flow diagram illustrating an exemplary method for creating a trace and track dataset, according to an aspect of an embodiment.

FIG. 3 is a flow diagram illustrating an exemplary method 300 for creating a trace and track dataset, according to an aspect of an embodiment. According to the aspect, the process begins at step 302 when packet analysis module 111 captures (e.g., receives, retrieves, or otherwise obtains) a network packet. As a next step 304, packet analysis module 111 may determine a network packet protocol associated with the captured network packet. At step 306, a metadata tag is applied to the captured network packet. The metadata tag may be logically or physically linked to network user. Tracing and tracking the movement of the tagged network packet as it traverses the network can produce user-level network trace information. This information and various other information may be collected as the tagged network is monitored by tagging and tracking engine 110 as it moves through the network at step 308. This may result in a trace and track dataset comprising various user-level trace information including, but not limited to: tagged network packets or events generated by an application during its execution (e.g., source/destination IP addresses, port numbers, protocols used, packet timestamps, and payload data); data related to application interactions with a network such as communication flows, requests and responses, and other network-related activities initiated by a user/application/process; protocol analysis information; and performance of network interactions from an application perspective. As a last step 310, tagging and tracking engine 110 may store the trace and track dataset in a database storage system. In various embodiments, this trace and track dataset may represent a baseline or initial dataset which can be used to create a user-level dependency graph. In such embodiments, the initial dataset may be enriched with other information from various sources including, for example, potential security vulnerabilities related to software applications as determined by analysis of crash dump data, data-flow information, and runtime trace data, to name a few types of data that can be used to enrich the trace and track dataset.

Figure 4:
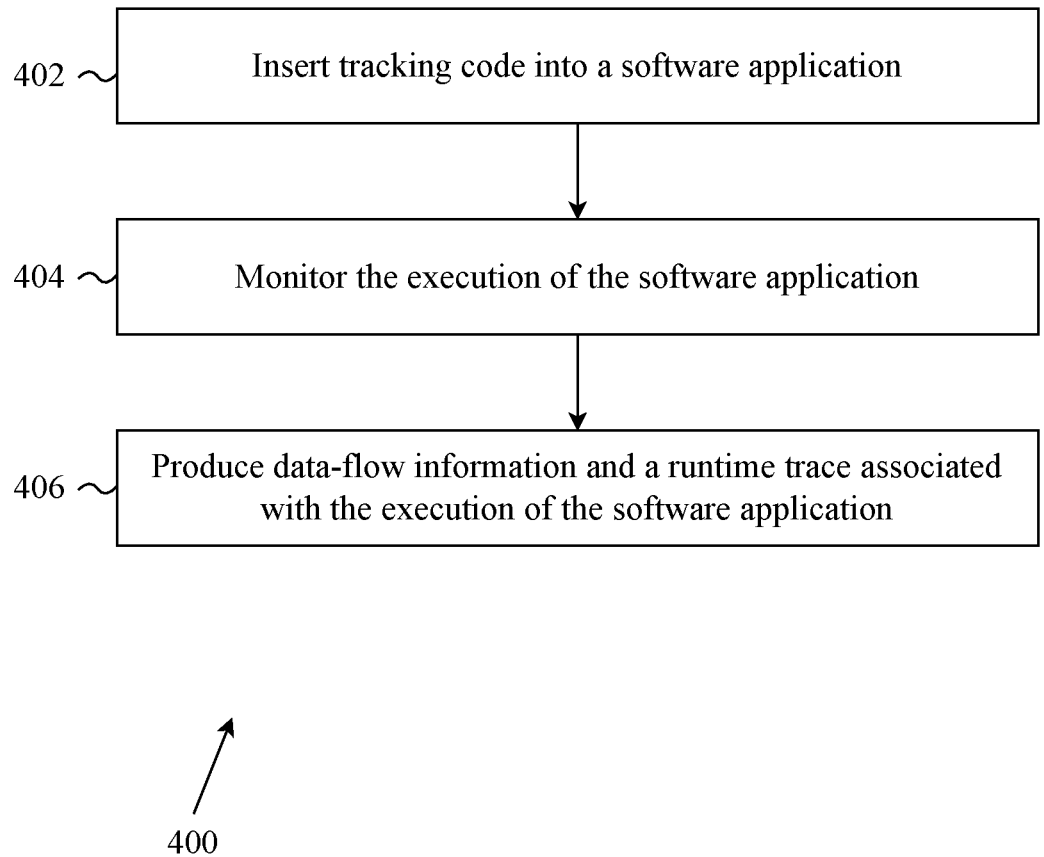
FIG. 4 is a flow diagram illustrating an exemplary method for obtaining data-flow information and runtime trace data, according to an aspect of an embodiment.

FIG. 4 is a flow diagram illustrating an exemplary method 400 for obtaining data-flow information and runtime trace data, according to an aspect of an embodiment. According to the aspect, the process begins at step 402 when software analyzer 117 receives a software application to process and inserts tracking code into the software application. Once the tracking code has been implemented, the next step 404 is to monitor the execution of the software application. This may be done in a controlled environment (e.g., sandbox, virtual machine, simulation, emulation, etc.). During and after monitoring the execution of the software application, software analyzer 117 collects data-flow information and runtime trace data associated with the execution of the software application at step 406. This information may be stored in a database 130.

Figure 5:
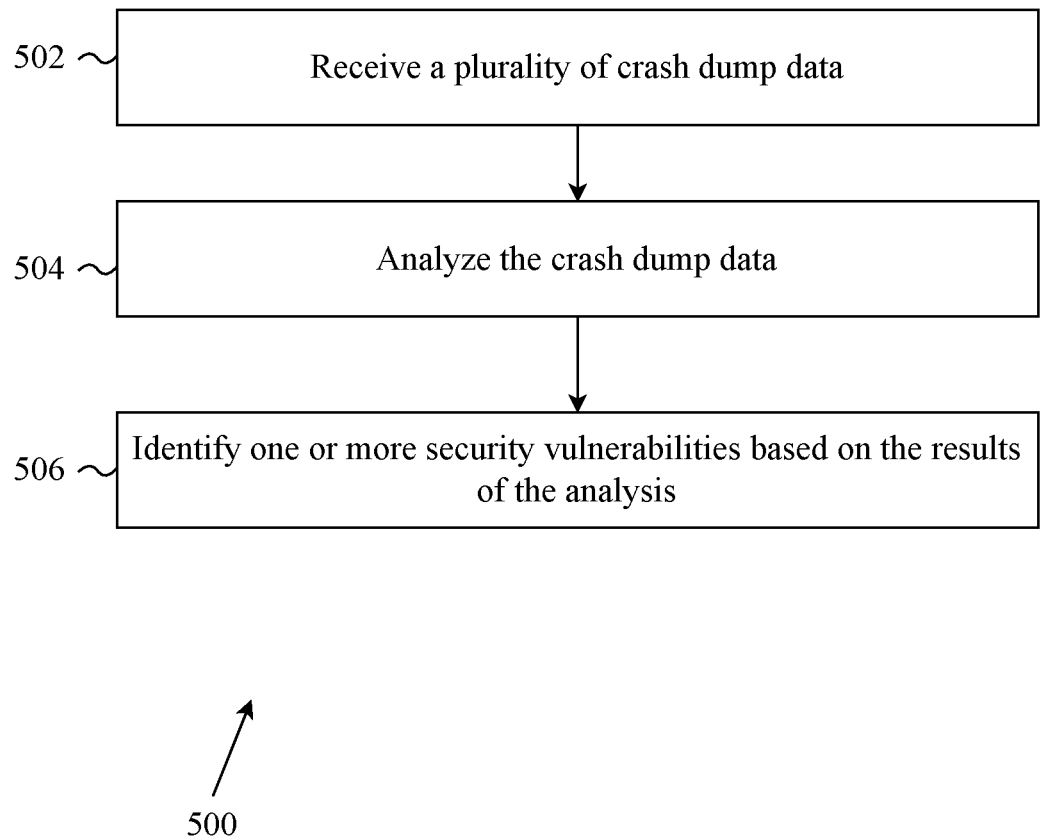
FIG. 5 is a flow diagram illustrating an exemplary method for identifying one or more potential security vulnerabilities based on crash dump data analysis, according to an aspect of an embodiment.

FIG. 5 is a flow diagram illustrating an exemplary method 500 for identifying one or more potential security vulnerabilities based on crash dump data analysis, according to an aspect of an embodiment. According to the aspect, the process begins at step 502 when crash analyzer 116 receives a plurality of crash dump data associated with an application or process that has experienced a crash during runtime/execution. In some implementations, crash dump data can include, but is not limited to, exception information, stack trace data, register values at the time of a crash, memory contents at the time of a crash, and system information (e.g., OS version, hardware configuration, loaded modules or libraries, etc.). At step 504 crash analyzer 116 analyzes the plurality of crash dump data. Various techniques for performing crash dump analysis may be implemented, according to the embodiment. For example, crash root cause analysis may be performed by examining the exception information, stack traces, and register values, the system can identify the specific point in the code where the crash occurred. This can help to identify potential vulnerabilities such as buffer overflows, null pointer references, or other memory-related issues that can lead to crashes or security breaches. Another type of crash dump analysis may involve memory corruption analysis by examining memory contents and analyzing suspicious values, unexpected data, or overflows, the system can identify memory corruption vulnerabilities like use-after-free or format string vulnerabilities. Yet another type of crash dump analysis that may be used is fuzzing and crash reproduction schemes. Crash dump data can be used as input for fuzzing or automated vulnerability discovery techniques. By replaying the crash-inducing inputs or creating variations of them, the system can attempt to reproduce the crash and trigger similar vulnerabilities. Fuzzing techniques can help in identifying input-driven vulnerabilities like buffer overflows, format string vulnerabilities, or SQL injection. These and other techniques may be used by themselves, or in some combination to perform crash dump data analysis. As a last step 506 crash analyzer 116 may identify one or more potential security vulnerabilities based on the results of the analysis. The identified security vulnerabilities may be stored in a database.

Figure 6:
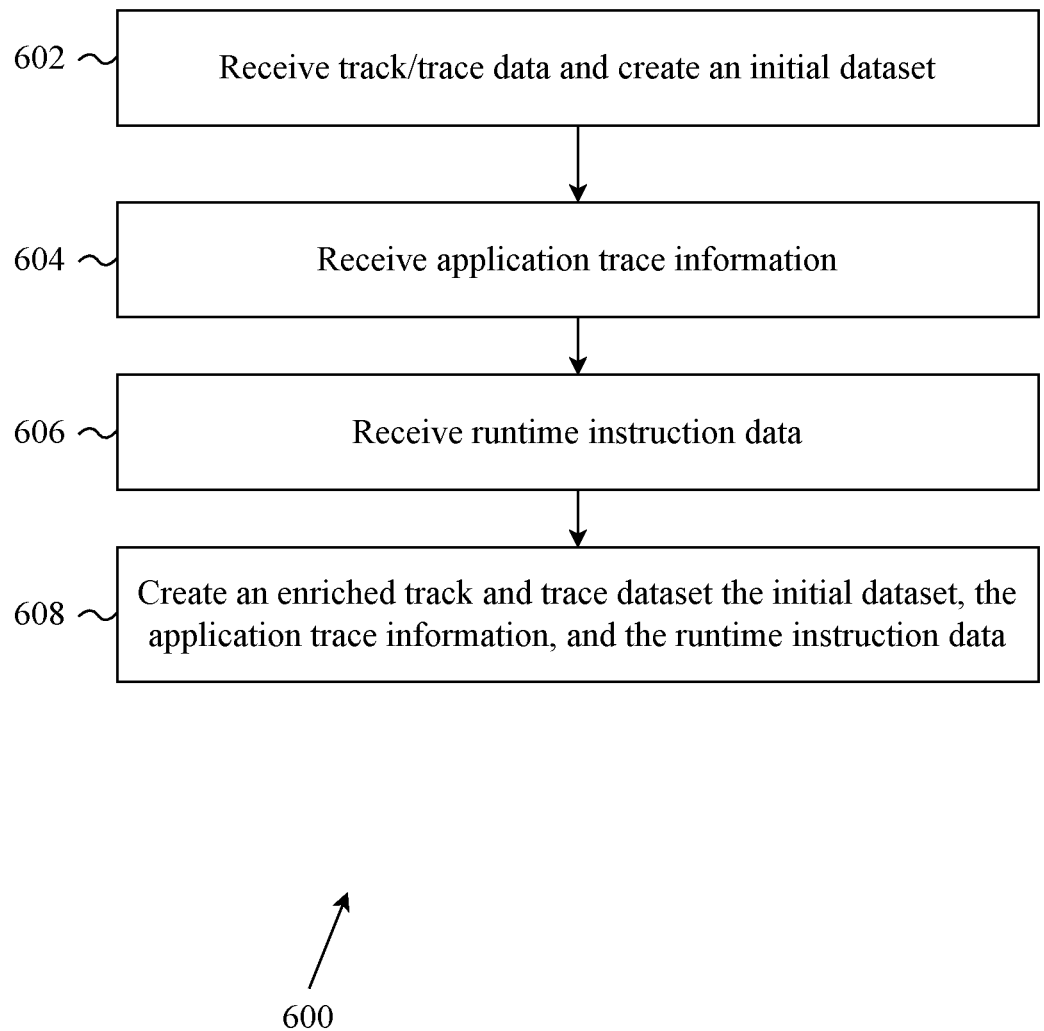
FIG. 6 is a flow diagram illustrating an exemplary method for creating an enriched trace and track dataset, according to an aspect of an embodiment.

FIG. 6 is a flow diagram illustrating an exemplary method 600 for creating an enriched trace and track dataset, according to an aspect of an embodiment. According to the aspect, the process begins at step 602 when tagging and tracking engine 110 receives trace and track data from packet analysis module 111 and forms an initial trace and track dataset. At step 604 tagging and tracking engine 110 obtains application trace information from software analyzer 117. In some embodiments, the application trace information comprises data-flow information, runtime trace data, or both. At step 606 tagging and tracking engine receives runtime instruction data from crash analyzer 116. In some embodiments, the runtime instruction data may comprise crash dump data and potential security vulnerabilities. As a last step 608 tagging and tracking engine 110 creates an enriched trace and track dataset by combining the application trace information and the runtime instruction data with the initial dataset. According to the aspect, a subset of this enriched trace and track dataset may be used to create one or more user-level dependency graphs.

Figure 7:
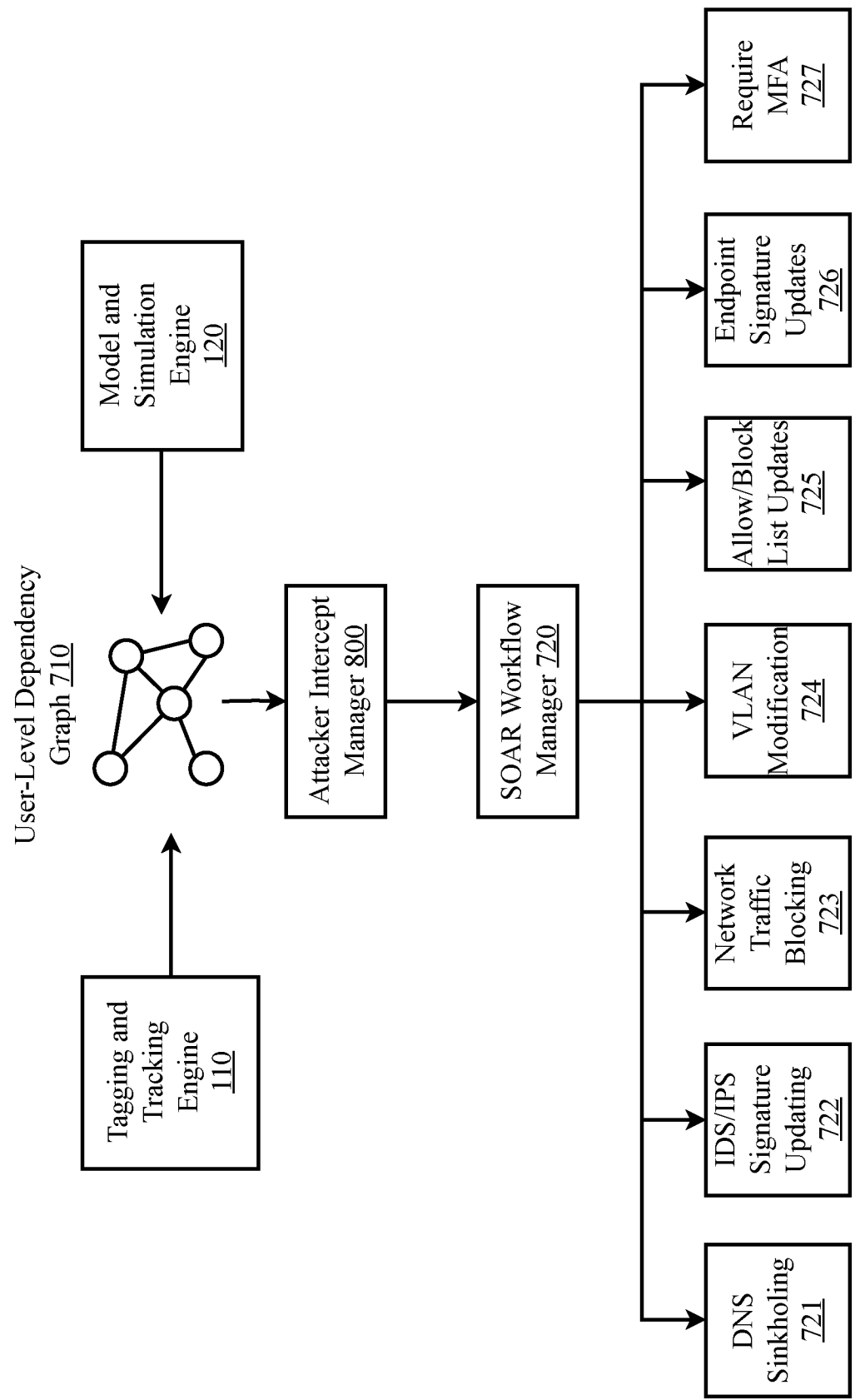
FIG. 7 is a block diagram illustrating an exemplary system architecture for an attacker interdiction system using user-level tracking and tracing.

FIG. 7 is a block diagram illustrating an exemplary system architecture for an attacker interdiction system using user-level tracking and tracing. In this example, data from tagging and tracking engine 110 is combined into a user-level dependency graph 710, indicating at a user and device level. A user-level dependency graph (or map) is a directed graph that represents the dependencies between users, devices, and software, for each user in the system (i.e., for each user, on which users, devices, and software is the user dependent and which devices, users, and software are dependent on this user, his devices, and software). It can be used to provide a visual representation of how different components within a network interact and rely on each other to fulfill user or application requirements, and to allow for modeling and simulation of attacks on a network based on the dependencies. The user-level dependency graph focuses on the relationships between and among components from the perspective of user interactions or application flows. It helps in understanding the dependencies between different features, functions, or modules of an application and how they contribute to the overall functionality. The graph visually represents the dependencies between different components, allowing stakeholders (e.g., enterprise security analysts) to understand the flow of data, control, or functionality with an application, including user entities and behaviors (UEBA).

Analysis of user-level dependency graph is performed by model and simulation engine 120. As the dependencies of users and devices within a network are contained within user-level dependency graph 710, modeling and simulation of impacts of cyberattacks and defenses on the network can be performed, indicating which users and devices on the network are vulnerable to certain types of attacks and which users and devices are resistant to certain types of attacks (or even beneficial to defense against certain types of attacks, such as confining attacks to users or devices which are invulnerable against them or are not core dependencies for more critical systems). Vulnerabilities of users and devices to attack can be modeled in numerous ways, such as by using graph traversal algorithms to identify paths to critical systems (i.e., those which are core dependencies for large portions of a network or critical systems on a network). Graph traversal algorithms can be used to identify these paths, for example, shortest path algorithms such as Dijkstra's algorithm, lowest overall cost algorithms, etc. Further, weights can be assigned to dependencies within the graph, for example, indicating that users and devices upon which large numbers of other users and devices are dependent (i.e., critical or core network systems or components which, if compromised, will compromise large portions of the network) are more critical than users and devices upon which few other users and devices are dependent. The shorter the path (or the lower the cost to traverse a path) from a given user or device to its dependencies, the more vulnerable the dependency is to attack, and the greater number of device dependent on the dependency, the more critical that dependency is to the network. After modeling of the network, simulations can be run to test different types of attacks and defenses on the modeled network. As an attack is run, model and simulation engine 120 follows the paths within the user-level dependency graph as modeled, indicating which users and devices have been compromised by the attack and why. Simulations can be run either separately from network operation or can be run as real-world attacks are occurring on the real network that has been modeled. In some embodiments, machine learning algorithms may be applied as simulations to identify hidden or previously-unknown vulnerabilities and avenues for defending against certain types of attacks (for example, shutting down certain non-critical dependencies to prevent against a certain type of attack without impacting large portions of a network). The outcome of each simulation can be used for attacker interdiction as described below.

After modeling and simulation engine 120 detects suspicious network traffic or behavior, an attacker intercept manager 800 can trigger one or more Security Orchestration, Automation, and Response (SOAR) workflows in response. A SOAR workflow is a predefined sequence of actions and automated tasks that are executed in response to a cybersecurity incident. SOAR workflows represent a comprehensive approach to cybersecurity incident management that combines people, processes, and technology to improve an organization's ability to detect, respond to, and recover from security incidents efficiently and effectively. Each SOAR workflow outlines the steps and processes to be followed when handling an incident, from initial detection to containment, investigation, and remediation. SOAR workflows are typically created based on established best practices, industry standards, and the specific needs of an organization. For example, depending on the type of attack detected, SOAR workflows can be created to perform DNS sinkholing, update IDS/IPS signatures, block certain network traffic, modify VLANs, change allow/block lists, change endpoint signatures, and to require multi-factor (MFA) authentication in response to mitigate attacks of that type or prevent their future occurrence.

Figure 8:
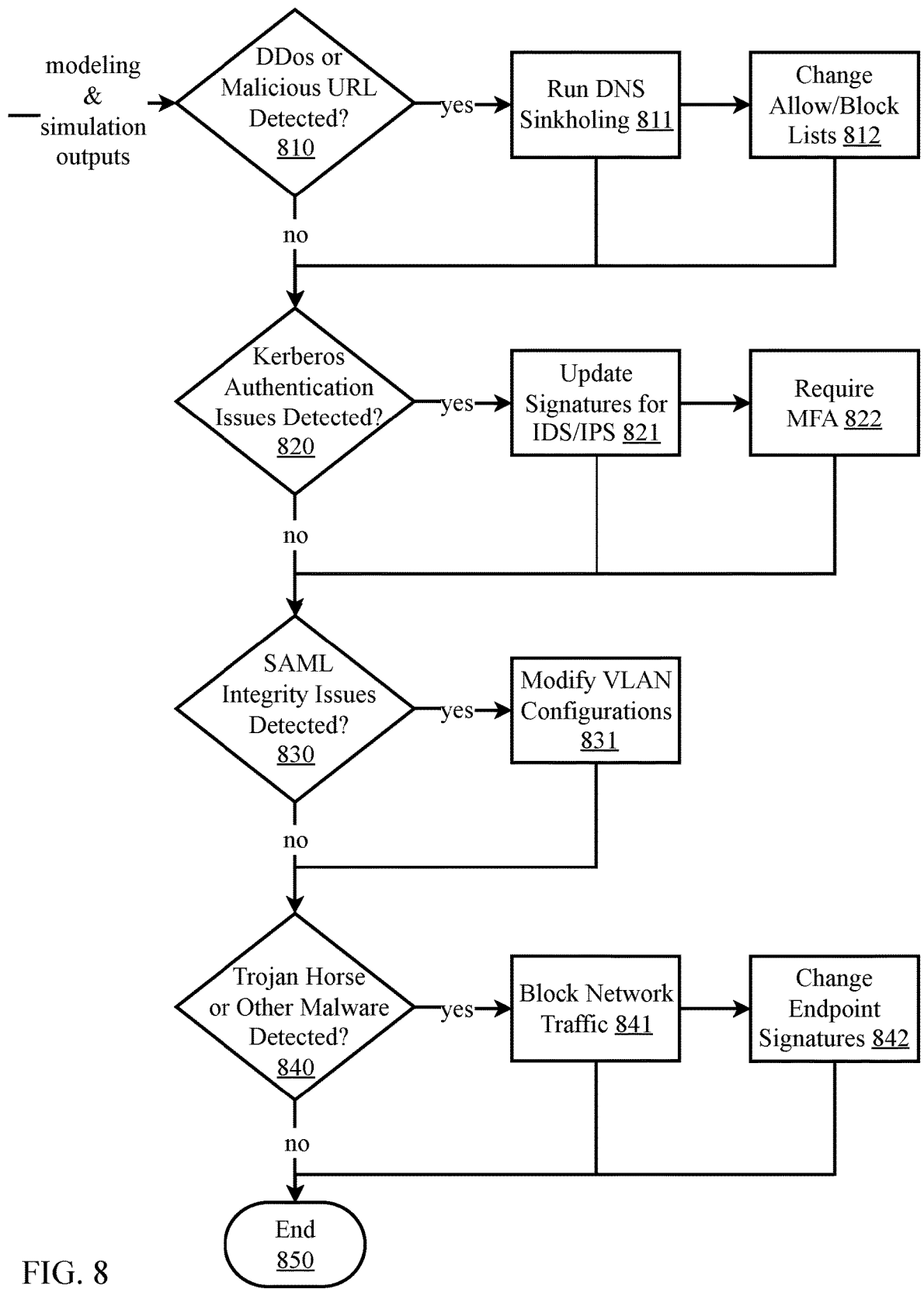
FIG. 8 is a flow diagram illustrating exemplary operation of an attacker interdiction manager.

FIG. 8 is a flow diagram illustrating exemplary operation of an attacker interdiction manager. After modeling and simulation engine 120 detects suspicious network traffic or behavior, an attacker intercept manager 800 can trigger one or more Security Orchestration, Automation, and Response (SOAR) workflows in response. A SOAR workflow manager 720 implements each workflow triggered by attacker intercept manager 800. A non-exhaustive list of exemplary workflows that can be implemented by SOAR workflow manager 720 includes DNS sinkholing 721, updating of IDS/IPS signatures 722, blocking certain network traffic 723, modifying VLANs 724, changing allow/block lists 725, changing endpoint signatures 726, and requiring multi-factor (MFA) authentication 727. Multiple workflows can be implemented either in series or in parallel to mitigate an attack, depending on a number of factors such as the type of attack, the type of users or devices affected, the number of users or devices affected, the criticality of users or devices affected, and other factors which may be indicated either by best practices or by the outputs of modeling and simulation engine 120 based on user-level dependency graph 110.

As a non-limiting example of operation of attacker intercept manager 800, after modeling and simulation engine 120 detects suspicious network traffic or behavior, attacker intercept manager 800 may run through a series of if-then statements which, if true, trigger certain SOAR workflows in sequence. Here, four different if-then statements are used in sequence.

If outputs from modeling and simulation engine 120 indicate that a DDOS attack is occurring or that a malicious URL has been detected 810 within the network, a SOAR workflow may be implemented to first implement DNS sinkholing 811 and then change allow/block lists 812 to prevent further such intrusions. DNS sinkholing involves redirecting malicious domain name resolutions to a non-existent IP address to prevent malware from communicating with its command-and-control server as further described below. Changing allow/block lists prevents reinfection by preventing affected users and devices from receiving or sending similar malicious code in the future as further described below.

If outputs from modeling and simulation engine 120 indicate that a Kerberos authentication issue has been detected 820 within the network, a SOAR workflow may be implemented to first update IDS/IPS signatures 821 and then require multi-factor authentication (MFA) 822 to prevent further such intrusions. IDS systems analyze network traffic or log data to identify patterns or characteristics that match known attack signatures or indicators of compromise (IOCs) which can then be used to mitigate the type of attack identified, as further described below. Updating of IDS signatures provides the latest information about patterns or rules that describe specific malicious activities, attack techniques, or suspicious behaviors, which can then be used for attacker interdiction to mitigate the type of attack indicated, as further described below. Multi-factor authentication (MFA), also known as two-factor authentication (2FA) or layered authentication, is a security mechanism that adds an additional layer of verification to the traditional username and password login process. It requires users to provide multiple forms of identification or evidence to prove their authenticity and gain access to a system, application, or online service, as further described below.

If outputs from modeling and simulation engine 120 indicate that a SAML integrity issue has been detected 830 within the network, a SOAR workflow may be implemented to modify VLAN configurations 831. By properly configuring VLANs and implementing appropriate modifications, organizations can improve network segmentation, access control, traffic isolation, and monitoring capabilities, as further described below.

If outputs from modeling and simulation engine 120 indicate that a SAML integrity issue has been detected 830 within the network, a SOAR workflow may be implemented to modify VLAN configurations 831. By properly configuring VLANs and implementing appropriate modifications, organizations can improve network segmentation, access control, traffic isolation, and monitoring capabilities, as further described below.

If outputs from modeling and simulation engine 120 indicate that a trojan horse or other malware has been detected 840 within the network, a SOAR workflow may be implemented to first block network traffic 841 and then to change endpoint signatures 842. Changing endpoint signatures can make it more difficult for attackers to identify and exploit vulnerabilities in a system by detecting attacks at network endpoints before they obtain access to core systems, as further described below.

Figure 9:
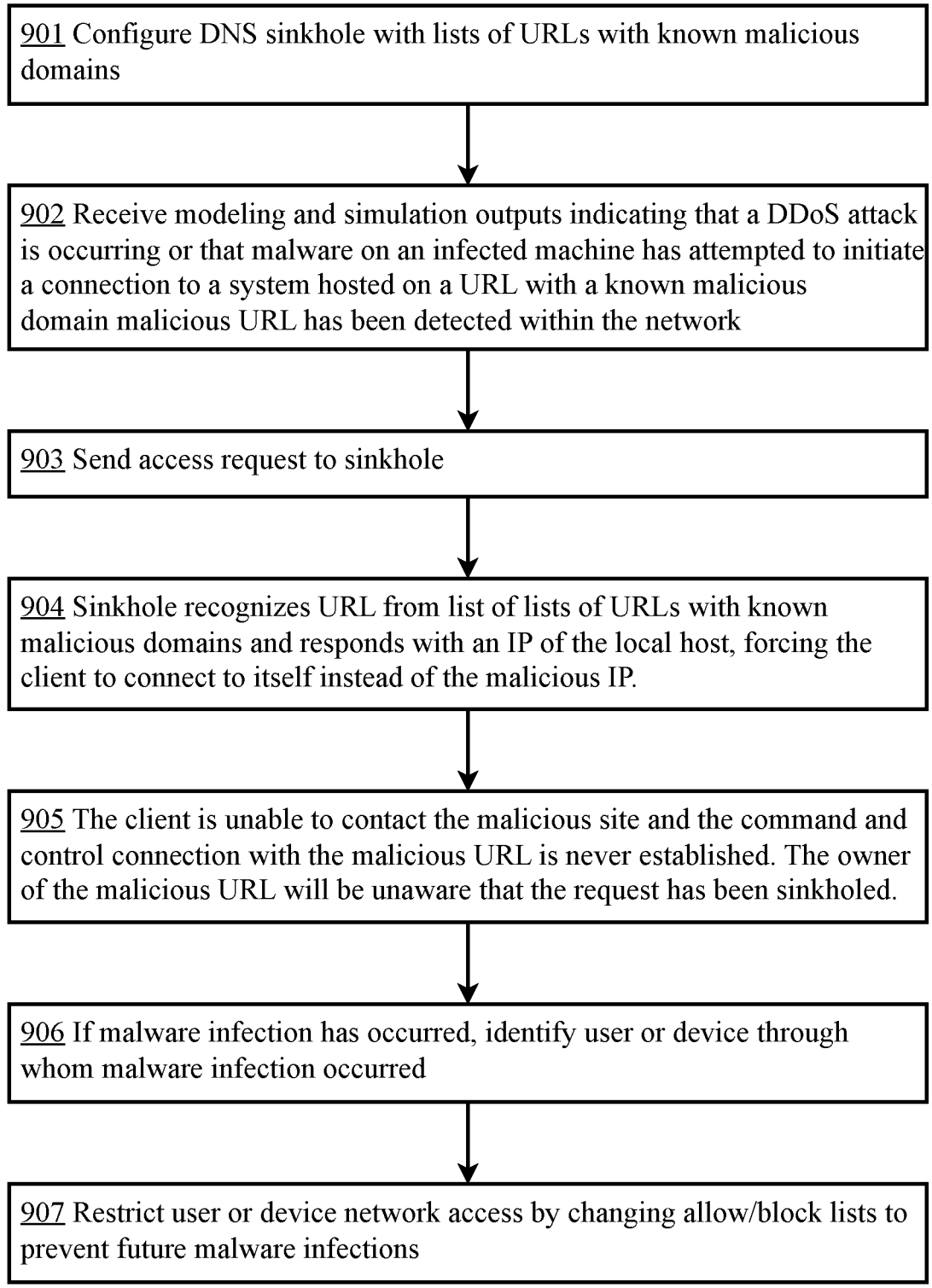
FIG. 9 is a flow diagram illustrating an exemplary overall SOAR workflow for attacker interdiction in response to DDOS or malware infection.

FIG. 9 is a flow diagram illustrating an exemplary overall SOAR workflow for attacker interdiction in response to DDOS or malware infection. DNS sinkholing can also be implemented using SOAR technology, which involves redirecting malicious domain name resolutions to a non-existent IP address to prevent malware from communicating with its command-and-control server. DNS sinkholing (also known as DNS blackholing or sinkhole DNS), is a technique used to redirect or block malicious network traffic by manipulating the Domain Name System (DNS) to redirect DNS requests for specific domain names to a controlled server or a "sinkhole" instead of the legitimate destination. The sinkhole server can be configured to analyze the intercepted traffic and determine if it is malicious. If deemed malicious, the sinkhole server can block or drop the connection, preventing the system from accessing the intended malicious resource.

DNS sinkholing can be used to block communication with known malicious domains, log and analyze the traffic directed to them, providing valuable insights into the nature of the threats and the behavior of infected systems, detect and block malware infections or botnet activities at an early stage, and to gather intelligence on threat actors, their infrastructure, and the techniques they employ.

To implement DNS sinkholing, security analysts or threat intelligence systems identify domain names associated with malicious activities, such as command-and-control servers, botnets, or known malware domains. At step 901, the DNS server responsible for resolving domain names is configured to redirect DNS requests for the identified malicious domains to a designated sinkhole server instead of returning the actual IP address associated with the domain.

As a non-limiting example of DNS sinkholing for attacker interdiction, at step 902, modeling and simulation outputs are received indicating that a DDOS attack is occurring or that malware on an infected machine has attempted to initiate a connection to a system hosted on a URL with a known malicious domain 902. At step 903, the DNS access request or requests are sent to the sinkhole server. At step 904, instead of resolving the domain to the IP address associated with the DNS access request, the sinkhole server recognizes the malicious URL and responds with an IP address under the control of the defender or security team, forcing the client to connect to itself instead of the malicious URL. At step 905, the client is unable to contact the malicious site and the command and control connection with the malicious URL is never established. The owner of the malicious URL will be unaware that the request has been sinkholed.

If a malware infection has been detected, changing of allow/block lists may also be implemented. Allow/block lists, also known as whitelists and blacklists, are security mechanisms used in network environments to control access to resources, restrict or permit certain actions, or filter network traffic based on predefined criteria. They are typically implemented at various levels within a network, such as firewalls, routers, email gateways, or web application filters.

Allow lists (aka whitelists) contain lists of approved entities, such as IP addresses, domain names, email addresses, or specific applications, that are explicitly permitted access to network resources or allowed to perform certain actions. Any entity not present in the whitelist is automatically denied access or blocked. Whitelists are often used to enforce strict access control policies and minimize the attack surface. For example, a firewall configured with a whitelist allows only specific IP addresses to access a particular server or service, blocking all other traffic. Block lists (aka blacklists) consist of entities that are explicitly prohibited or considered malicious. They contain entries such as IP addresses, domain names, email addresses, URLs, or file hashes associated with known threats or undesirable content. Network devices compare incoming entities against the blacklist and block or restrict access for any matching entries. Blacklists are used to prevent access to malicious or unauthorized resources. For example, an email gateway may be equipped with a blacklist filters incoming emails and blocks those originating from known spam email servers or containing malware attachments.

The usage of allow/block lists in a network allows for granular control over network access, ensuring that only authorized entities are permitted while denying access to unauthorized or potentially malicious sources; defense against known threats, such as malware, phishing, or botnets, by blocking access to known malicious entities; enforcement of security policies, regulatory compliance, and acceptable use policies within the network environment; and protection of critical resources, such as servers, databases, or sensitive data, from unauthorized access or potential exploitation.

As a non-limiting example of changing attack/block lists for attacker interdiction, at step 906, the user (or device) through whom the infection occurred is identified using user-level dependencies graph 710. At step 907, network access of the identified user or device is restricted by changing allow/block lists to prevent future malware infections.

Figure 10:
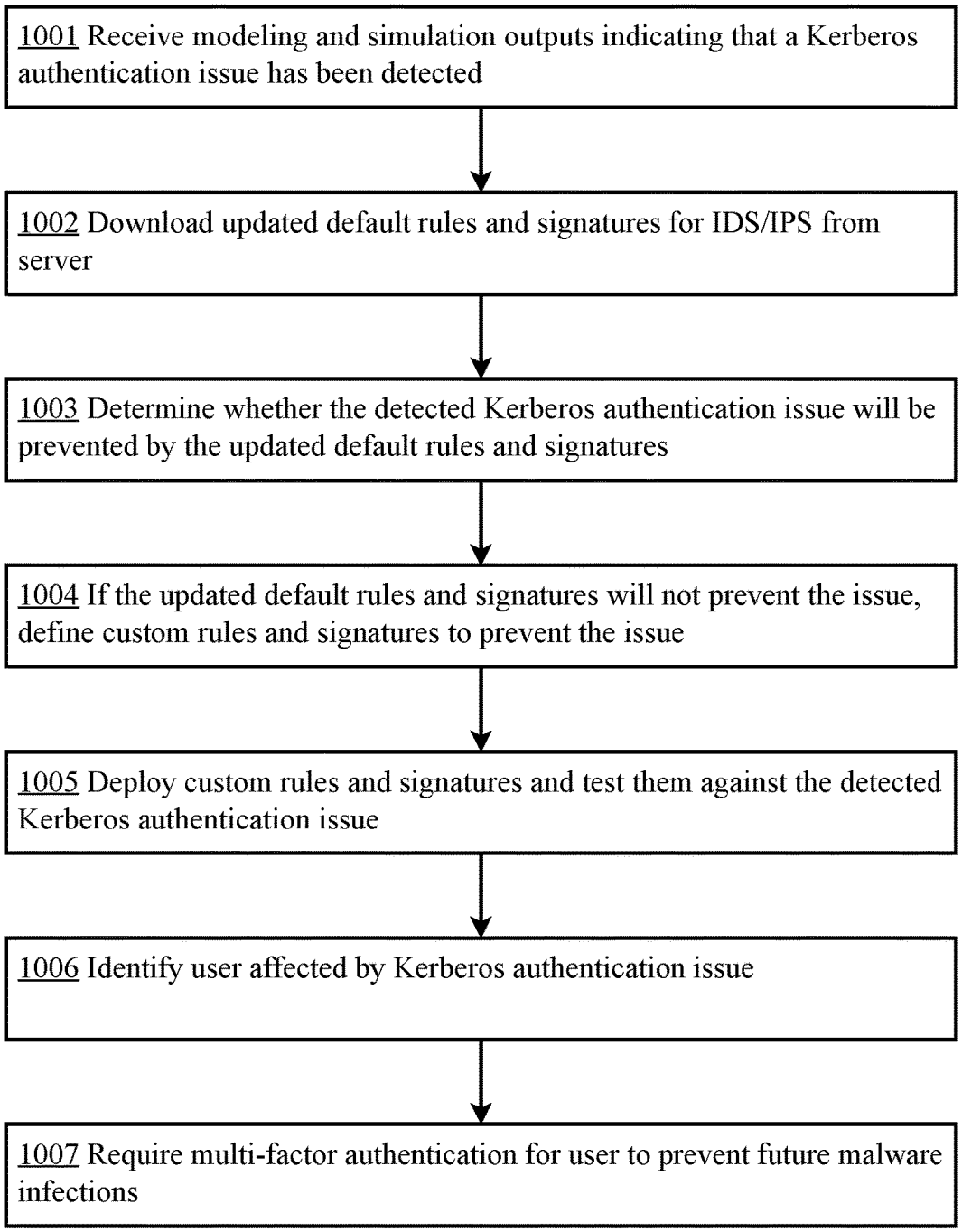
FIG. 10 is a flow diagram illustrating an exemplary SOAR workflow for attacker interdiction in response to a Kerberos authentication issue.

FIG. 10 is a flow diagram illustrating an exemplary SOAR workflow for attacker interdiction in response to a Kerberos authentication issue. Kerberos authentication issues arise from any one of a number of cyberattack types including Kerberos spoofing, Kerberos replay attacks, Kerberos password guessing and brute-force attacks, Kerberos ticket granting service attacks (e.g., silver ticket and golden ticket attacks), and Kerberos denial of service (DOS) or distributed denial of service (DDOS) attacks (which can disrupt Kerberos authentications and deny legitimate users access to resources).

IDS (Intrusion Detection System) and IPS (Intrusion Prevention System) signatures are essential components of cybersecurity that help identify and defend against known threats and attacks. They are used to detect and prevent malicious activities within a network environment.

In operation, IDS systems analyze network traffic or log data to identify patterns or characteristics that match known attack signatures or indicators of compromise (IOCs). IDS signatures are pre-defined patterns or rules that describe specific malicious activities, attack techniques, or suspicious behaviors. These signatures are created based on research, analysis of attack methods, and knowledge of vulnerabilities by IT security experts and published in databases available online. When network traffic matches an IDS signature, an alert is generated to notify security administrators of a potential security incident. IDS signatures can cover various types of attacks, including malware infections, network scans, SQL injections, buffer overflows, and more. They serve as a reference for detecting potential threats and are regularly updated to address emerging attack vectors.

IPS systems, on the other hand, go beyond detection and provide active prevention capabilities. IPS signatures are similar to IDS signatures, but they not only identify malicious traffic but also take proactive action to block or mitigate the threat. When an IPS system identifies traffic matching a known signature, it can automatically drop or modify packets, block connections, or invoke other actions to prevent the attack from reaching its intended target. IPS signatures are designed to complement IDS signatures, focusing on real-time prevention and immediate response to potential threats. They enable organizations to proactively defend their networks by blocking malicious traffic and neutralizing known attack vectors.

The usage of IDS/IPS signatures in cybersecurity enables detection of known attack patterns, aiding in the identification of malicious activities and potential security breaches within a network; generation of alerts and triggering of immediate actions to prevent or mitigate attacks in real-time, minimizing the impact of security incidents; and addressing of emerging threats and keep up with evolving attack methods. For both IDS and IPS systems, security vendors and organizations continuously research and develop new IPS signatures to improve detection and prevention capabilities.

As a non-limiting example of IDS/IPS signature updates for attacker interdiction, at step 1001, modeling and simulation outputs are received indicating that a Kerberos authentication issue has been detected. Default IDS/IPS rules and signatures are downloaded from a cybersecurity server (often maintained by third parties). At step 1003, a determination is made as to whether the detected Kerberos authentication issue will be prevented by the updated default rules and signatures. At step 1004, if the updated default rules and signatures will not prevent the issue, custom rules and signatures are defined to prevent the issue. At step 1005, the custom rules and signatures are deployed and tested against the detected Kerberos authentication issue.

Subsequently, multi-factor authentication (MFA) can also be used as a security measure to challenge users who are identified as potentially risky or suspicious. Multi-factor authentication (MFA), also known as two-factor authentication (2FA) or layered authentication, is a security mechanism that adds an additional layer of verification to the traditional username and password login process. It requires users to provide multiple forms of identification or evidence to prove their authenticity and gain access to a system, application, or online service.

Typically, multi-factor authentication uses one of three types of authentication, something the user knows (a knowledge-based factor, such as a password, PIN, or security question), something the user has possession of (a physical or digital token, such as a smartphone, hardware token, smart card, or security key), or something about the user himself or herself (biometric characteristics unique to the individual, such as fingerprints, facial recognition, iris or retina scans, voice recognition, or even behavioral biometrics like typing patterns or mouse movements). To authenticate using multi-factor authentication, a user must provide at least two of these authentications. For example, after entering a username and password (knowledge factor), he or she may be required to enter a one-time password generated by a mobile app (possession factor) or provide a fingerprint scan (biometric factor).

The purpose of multi-factor authentication is to significantly enhance security by reducing the reliance on passwords alone. Even if a password is compromised, an additional factor is still required for successful authentication, making it much more challenging for unauthorized individuals to gain access to sensitive systems or data. MFA provides increased security adding an extra layer of protection, making it harder for attackers to gain unauthorized access through stolen or guessed passwords and by making it more difficult for attackers to misuse stolen credentials by requiring authentications that they aren't likely to have.

As a non-limiting example of using MFA for attacker interdiction, at step 1006, the user affected by the Kerberos authentication issue is identified using user-level dependencies graph 710. At step 1007, the identified user is required to use multi-factor authentication for access to the affected resources to prevent future malware infections.

Figure 11:
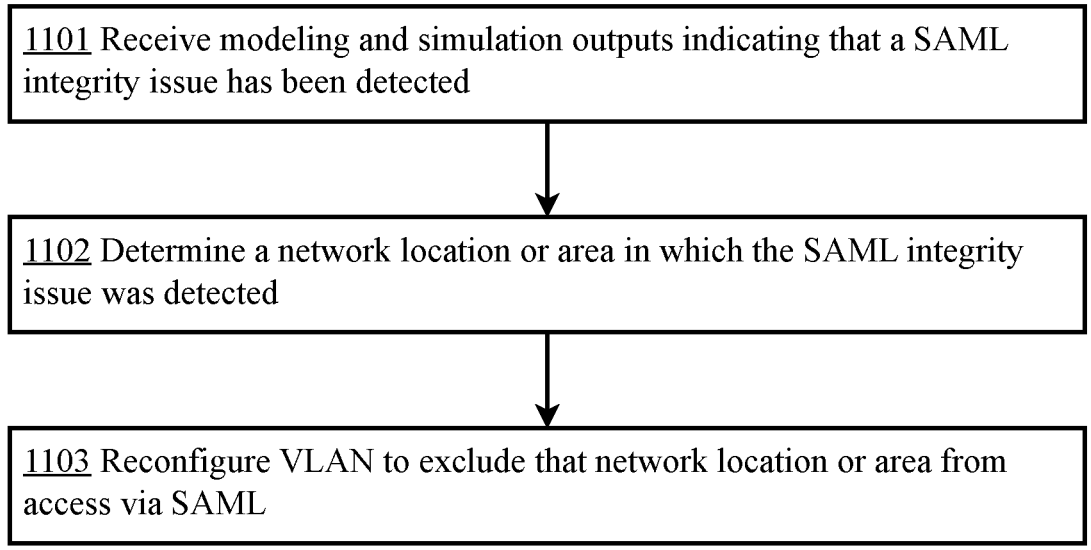
FIG. 11 is a flow diagram illustrating an exemplary AI or automated planning enhanced SOAR workflow for attacker interdiction in response to a SAML integrity issue.

FIG. 11 is a flow diagram illustrating an exemplary SOAR workflow for attacker interdiction in response to a SAML integrity issue or NTLM potential authentication issue. SAML integrity issues (and NTLM potential authentication issues) may arise from any one of a number of cyberattack types including eavesdropping, theft of user authentication, theft of bearer token, message deletion, message modification, and man-in-the-middle attacks. VLAN (Virtual Local Area Network) modification can play a significant role in enhancing cybersecurity within a network environment. By properly configuring VLANs and implementing appropriate modifications, organizations can improve network segmentation, access control, traffic isolation, and monitoring capabilities. VLAN modification can help with cybersecurity by allowing the logical division of a physical network into multiple virtual networks, segmenting the network based on departments, teams, or applications, containing security incidents, and limiting lateral movement in case of a breach; preventing unauthorized access to sensitive systems and resources by restricting communication between VLANs; enforcing access control policies by assigning specific VLAN memberships to different user groups or devices, and regulating network access based on job roles, security clearance, or other defined criteria, thereby reducing the attack surface and restricts unauthorized users from accessing critical resources; isolating traffic between different network segments by separating types of traffic, such as guest networks, IoT devices, or critical infrastructure, VLAN modification can prevent unauthorized or malicious activities from impacting other segments of the network, helping to contain and limit the propagation of threats within the network; mitigating the impact of broadcast storms, which occur when a network device generates excessive broadcast or multicast traffic, potentially causing network congestion or disruption by segmenting the network using VLANs, containing traffic within individual VLANs, limiting its impact on the entire network; configuring VLAN-specific monitoring and intrusion detection systems to capture and analyze traffic within specific VLANs, allowing administrators to detecting and mitigating attacks, and identify abnormal traffic patterns or unauthorized access attempts; and facilitate compliance with regulatory requirements by segmenting sensitive data to achieve separation and access control required by industry regulations like Payment Card Industry Data Security Standard (PCI DSS) or Health Insurance Portability and Accountability Act (HIPAA).

As a non-limiting example of VLAN modification for attacker interdiction, at step 1101, modeling and simulation outputs are received indicating that a SAML integrity issue has been detected. At step 1102, a network location or area in which the SAML integrity issue has been detected is determined using user-level dependency graph 710. At step 1103, VLAN modifications are made, reconfiguring the VLAN to exclude that network location or area from access via SAML.

The methodologies described above may be applied to other security protocols or implementations and variations of security protocols such as Oauth2 or OIDC.

Figure 12:
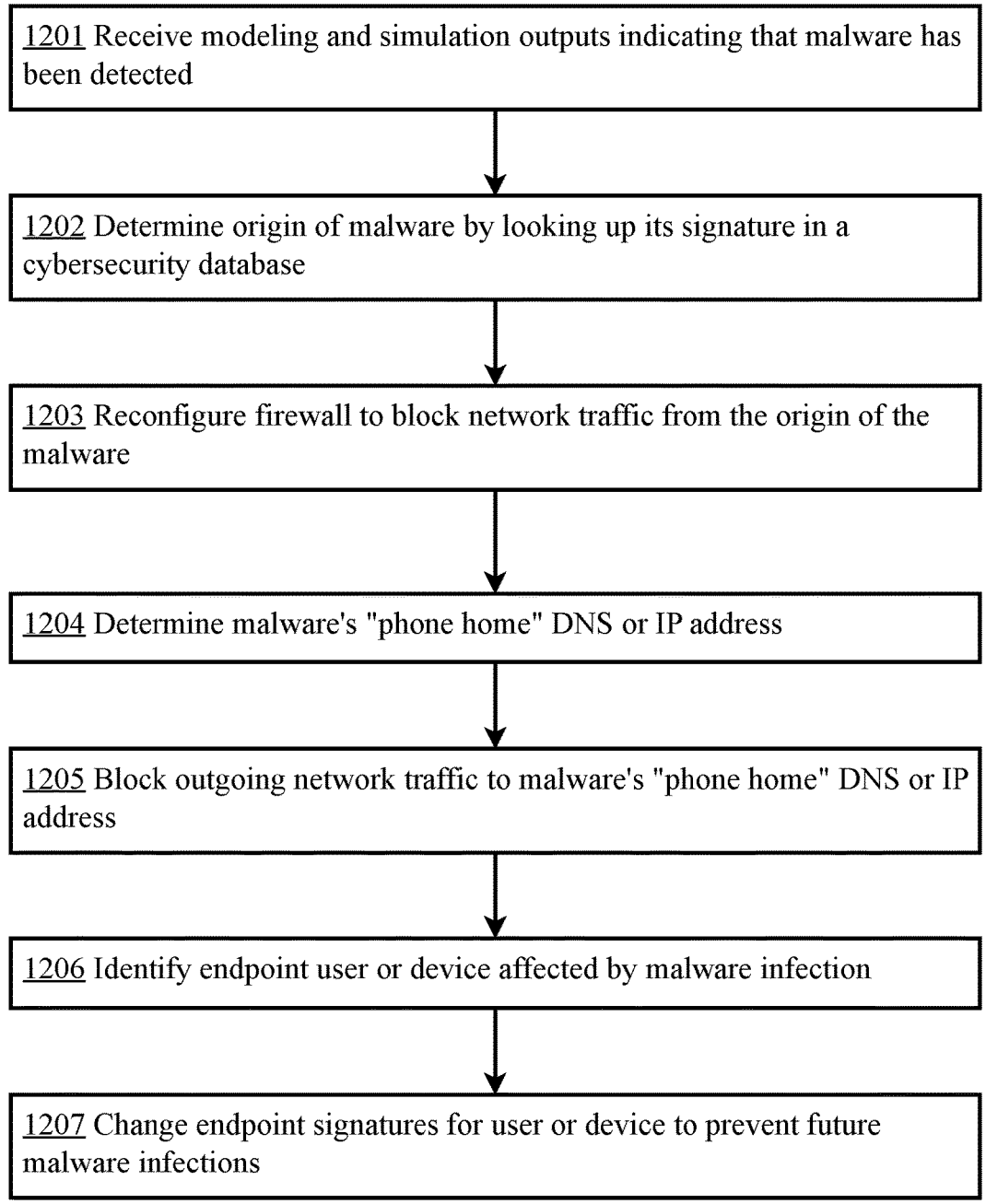
FIG. 12 is a flow diagram illustrating an exemplary SOAR workflow for attacker interdiction in response to detection of malware or malicious actor.

FIG. 12 is a flow diagram illustrating an exemplary SOAR workflow for attacker interdiction in response to detection of malware. Blocking network traffic is an essential measure in cybersecurity to protect networks, systems, and data from various threats. By selectively blocking specific types of network traffic, organizations can mitigate risks, prevent unauthorized access, and reduce the attack surface. Blocking network traffic be used for attacker interdiction by preventing malicious traffic from DoS and DDOS attacks from overwhelming network resources by identifying and blocking traffic patterns associated with these attacks; by blocking known malicious traffic, such as communication with command-and-control servers or traffic associated with malware infections, can prevent the spread of malware within the network; by blocking outbound connections to malicious IP addresses or domains helps stop infected systems from communicating with attackers and limits their ability to exfiltrate data or receive commands; by using intrusion prevention systems (IPS) or intrusion detection systems (IDS) to analyze network traffic for suspicious patterns or known attack signatures and can take proactive action to block or prevent potentially malicious traffic; and by content filtering to protect users from phishing, malware distribution, or accessing unauthorized content.

As a non-limiting example of blocking network traffic for attacker interdiction, at step 1201, modeling and simulation outputs are received indicating that malware has been detected within the network. At step 1202, the origin of the detected malware is determined by looking up its signature in a cybersecurity database. At step 1203, the network's firewall is reconfigured to block network traffic from the origin of the malware (e.g., emails containing malicious code, etc.). At step 1204, outgoing network traffic to the malware's "phone home" DNS or IP address is blocked to prevent activation of the malware.

Similarly, endpoint signatures can be modified to isolate or remediate an infected endpoint, update security software, or take other actions to contain the threat. Changing endpoint signatures can help with cybersecurity by making it more difficult for attackers to identify and exploit vulnerabilities in a system. Endpoint signatures can be used by security solutions, such as antivirus software, to detect known malicious patterns or behaviors. By altering these signatures, organizations can enhance their cybersecurity evading known types of cyberattacks, protecting against zero-day exploits, and reducing signature-based attacks by making it more difficult for malicious code that relies on endpoint signatures to recognize them or exploit them.

As a non-limiting example of changing endpoint signatures for attacker interdiction, at step 1206, the endpoint user or device affected by the malware infection is identified. At step 1207, the endpoint signature for the affected endpoint user or device is changed to prevent recognition by similar malware infection attempts.

Exemplary Computing Environment

Figure 13:
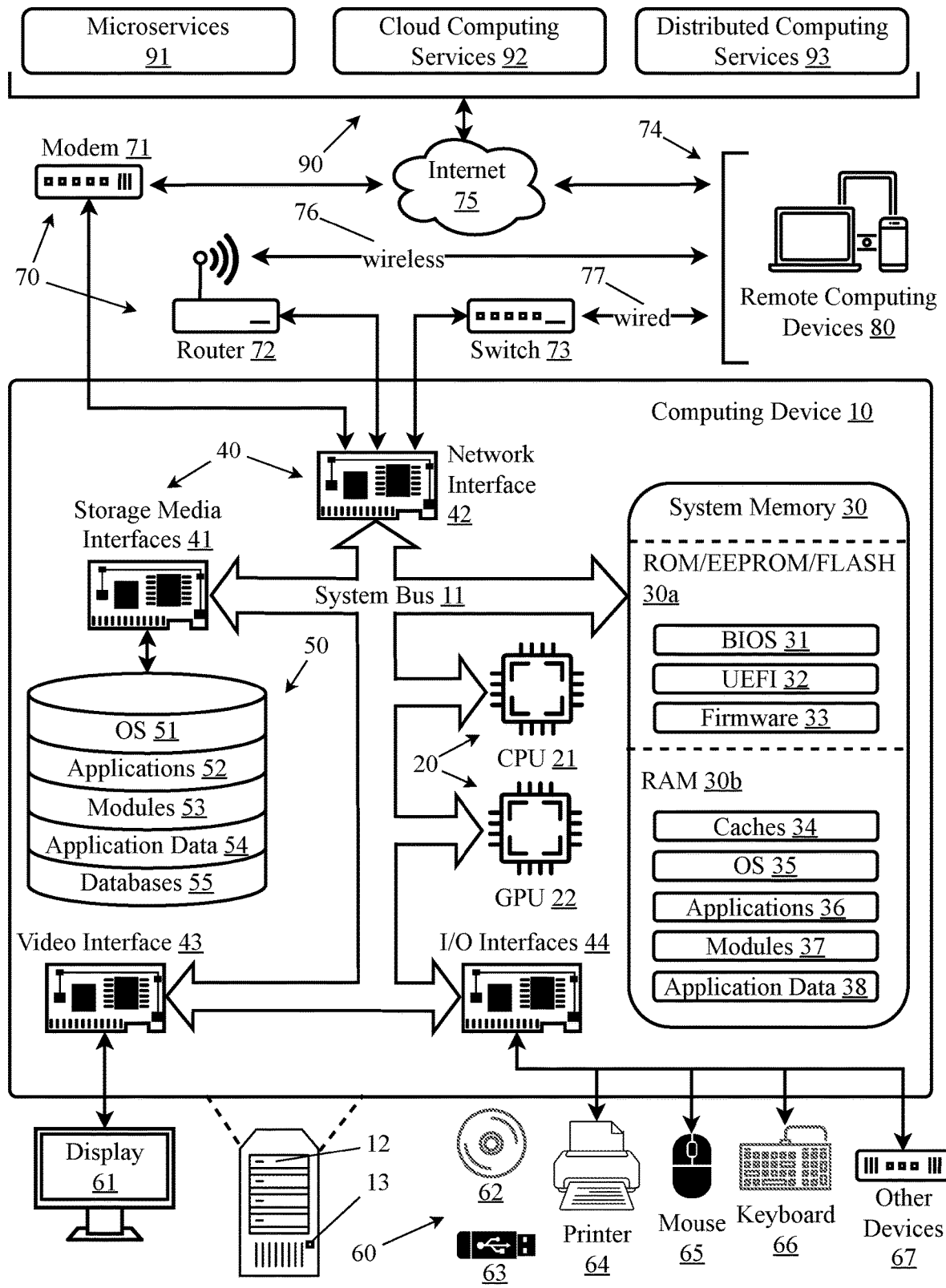
FIG. 13 illustrates an exemplary computing environment on which an embodiment described herein may be implemented, in full or in part.

FIG. 13 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between, those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed, or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 1, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 5 and applications 6 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random access memory (RAM), and is normally the primary operating memory into which the operating system 5, applications 6, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 5 for use) such processes and components may reside or be processed at various times in different components of computing device 10, remote computing devices 80, and/or cloud-based services 90.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP or message queues. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

What is claimed is:

1. A system for cybersecurity attacker interdiction using user-level network tracking and tracing, comprising:
    a computing device comprising a memory, a processor, and a non-volatile data storage device;
    a user-level dependency graph stored on the non-volatile data storage device, the user-level dependency graph comprising a model of a computer network identifying dependencies of users and devices in the computer network on other users and devices in the computer network; and
    a modeling and simulation engine comprising a first plurality of programming instructions stored in the memory which, when operating on the processor, causes the computing device to:
        create a model of vulnerabilities, including lateral movement and privilege escalation paths, of the computer network to cyberattacks by running one or more graph traversal algorithms on the user-level dependency graph to identify paths to critical systems within the user-level dependency graph;
        run a simulated or real cyberattack on the model of vulnerabilities of the computer network, the simulated or real cyberattack comprising a cyberattack type;
        identify a user or device of the computer network that has been compromised by the simulated or real cyberattack; and
        send the cyberattack type and identified user or device to an attacker intercept manager;
    the attacker intercept manager comprising a second plurality of programming instructions stored in the memory which, when operating on the processor, causes the computing device to:
        receive the cyberattack type and identified user or device;
        leverage a simulation, automated planning engine or AI planner to determine from the cyberattack type at least one appropriate security orchestration, automation, and response (SOAR) workflow from available planning choices;
        implement the determined SOAR workflow; and
        apply a restriction or configuration change to the identified user, device, or to a source, destination or pattern of identified traffic associated with the identified user or device to prevent further compromises of that user or device by the cyberattack or abuse.

2. The system of claim 1, wherein the cyberattack type is a denial of service (DoS) or distributed denial of service (DDoS) type of cyberattack and the SOAR workflow comprises DNS sinkholing.

3. The system of claim 1, wherein the cyberattack type is a cyberattack type from the list of Kerberos spoofing, Kerberos replay attacks, Kerberos password guessing and brute-force attacks, Kerberos ticket granting service attacks, and Kerberos denial of service (DoS) or distributed denial of service (DDoS) attacks, and the SOAR workflow comprises updating of intrusion detection system (IDS) signatures, intrusion prevention system (IPS) signatures, or both.

4. The system of claim 1, wherein the cyberattack type is a cyberattack type from the list of eavesdropping, theft of user authentication, theft of bearer token, message deletion, message modification, and man-in-the-middle, and the SOAR workflow comprises DNS sinkholing.

5. The system of claim 1, wherein the cyberattack type is malware detected within the computer network, and the SOAR workflow comprises blocking network traffic.

6. The system of claim 1, wherein the implementation of the determined SOAR workflow is based on user input and confirmation.

7. The system of claim 1, wherein the user-level dependency graph is enriched with a plurality of tagged authentication and authorization events including, and wherein the modeling and simulation engine uses the plurality of tagged authentication and authorization events to identify authentication-based attack paths within the model of vulnerabilities.

8. The system of claim 1, wherein the second plurality of programming instructions further cause the attacker intercept manager to:

monitor both network packet traffic and application-level distributed tracing data to detect compromise indicators beyond network card traffic; and apply restrictions to application sessions and authentication tokens associated with the identified user or device in addition to network-level restrictions.

9. The system of claim 1, wherein the first plurality of programming instructions further cause the modeling and simulation engine to:

enrich the user-level dependency graph with application trace information and runtime instruction data collected from applications running on devices in the computer network; and use the enriched application trace information to identify vulnerabilities that exist above the network layer including application-level and session-level vulnerabilities.

10. The system of claim 1, wherein the SOAR workflow is determined dynamically by the automated planning service.

11. A method for cybersecurity attacker interdiction using user-level network tracking and tracing, comprising the steps of:

storing a user-level dependency graph on a non-volatile data storage device of a computing device comprising a memory, a processor, and the non-volatile data storage device, the user-level dependency graph comprising a model of a computer network identifying dependencies of users and devices in the computer network on other users and devices in the computer network; and using a modeling and simulation engine operating on the computing device to:

create a model of vulnerabilities, including lateral movement and privilege escalation paths, of the computer network to cyberattacks by running one or more graph traversal algorithms on the user-level dependency graph to identify paths to critical systems within the user-level dependency graph;

run a simulated or real cyberattack on the model of vulnerabilities of the computer network, the simulated or real cyberattack comprising a cyberattack type;

identify a user or device of the computer network that has been compromised by the simulated or real cyberattack; and send the cyberattack type and identified user or device to an attacker intercept manager operating on the computing device;

using the attacker intercept manager comprising a second plurality of programming instructions stored in the memory which, when operating on the processor, causes the computing device to:

receive the cyberattack type and identified user or device;

leverage a simulation, automated planning engine, or AI planner to determine from the cyberattack type at least one an appropriate security orchestration, automation, and response (SOAR) workflow from available planning choices;

implement the determined SOAR workflow; and apply a restriction or configuration change to the identified user, device, or to a source, destination or pattern of identified traffic associated with the identified user or device to prevent further compromises of that user or device by the cyberattack or abuse.

12. The method of claim 11, wherein the cyberattack type is a denial of service (DoS) or distributed denial of service (DDoS) type of cyberattack and the SOAR workflow comprises DNS sinkholing.

13. The method of claim 11, wherein the cyberattack type is a cyberattack type from the list of Kerberos spoofing, Kerberos replay attacks, Kerberos password guessing and brute-force attacks, Kerberos ticket granting service attacks, and Kerberos denial of service (DoS) or distributed denial of service (DDoS) attacks, and the SOAR workflow comprises updating of intrusion detection system (IDS) signatures, intrusion prevention system (IPS) signatures, or both.

14. The method of claim 11, wherein the cyberattack type is a cyberattack type from the list of eavesdropping, theft of user authentication, theft of bearer token, message deletion, message modification, and man-in-the-middle, and the SOAR workflow comprises DNS sinkholing.

15. The method of claim 11, wherein the cyberattack type is malware detected within the computer network, and the SOAR workflow comprises blocking network traffic.

16. The method of claim 11, wherein the implementation of the determined SOAR workflow is based on user input and confirmation.

17. The method of claim 11, wherein the user-level dependency graph is enriched with a plurality of tagged authentication and authorization events including, and wherein the modeling and simulation engine uses the plurality of tagged authentication and authorization events to identify authentication-based attack paths within the model of vulnerabilities.

18. The method of claim 11, further comprises the steps of:

monitoring both network packet traffic and application-level distributed tracing data to detect compromise indicators beyond network card traffic; and applying restrictions to application sessions and authentication tokens associated with the identified user or device in addition to network-level restrictions.

19. The method of claim 11, further comprising the steps of:

enriching the user-level dependency graph with application trace information and runtime instruction data collected from applications running on devices in the computer network; and using the enriched application trace information to identify vulnerabilities that exist above the network layer including application-level and session-level vulnerabilities.

20. The method of claim 11, wherein the SOAR workflow is determined dynamically by the automated planning service.

* * * * *